(12) United States Patent
Forrest et al.

(10) Patent No.: US 10,766,361 B2
(45) Date of Patent: Sep. 8, 2020

(54) WHEEL DRIVE TRANSMISSION

(71) Applicant: Auburn Gear, LLC, Auburn, IN (US)

(72) Inventors: James L. Forrest, Ashley, IN (US);
Steve M. Juhasz, Bryan, OH (US);
Dan M. Metzger, Fort Wayne, IN (US); Joseph A. Beals, Edgerton, OH (US)

(73) Assignee: Auburn Gear, Inc., Auburn, IN (US)

( * ) Notice: Subject to any disclaimer, the term of this patent is extended or adjusted under 35 U.S.C. 154(b) by 0 days.

(21) Appl. No.: 16/325,586

(22) PCT Filed: Aug. 15, 2016

(86) PCT No.: PCT/US2016/047038
§ 371 (c)(1),
(2) Date: Feb. 14, 2019

(87) PCT Pub. No.: WO2018/034647
PCT Pub. Date: Feb. 22, 2018

(65) Prior Publication Data
US 2019/0176616 A1    Jun. 13, 2019

(51) Int. Cl.
*F16H 1/46*     (2006.01)
*B60K 17/04*    (2006.01)
(Continued)

(52) U.S. Cl.
CPC ............ *B60K 17/046* (2013.01); *B60K 17/04* (2013.01); *B60K 17/08* (2013.01); *F16D 1/10* (2013.01);
(Continued)

(58) Field of Classification Search
None
See application file for complete search history.

(56) References Cited

U.S. PATENT DOCUMENTS

| 1,380,547 A | 6/1921 | Farmer |
| 2,386,917 A | 10/1945 | Thornton |
| (Continued) | | |

FOREIGN PATENT DOCUMENTS

| CN | 102 588 570 | 7/2012 |
| EP | 2135767 | 12/2009 |
| WO | 2014065851 | 5/2014 |

OTHER PUBLICATIONS

International Search Report and Written Opinion dated Dec. 27, 2016 in PCT/US2016/047038.
(Continued)

*Primary Examiner* — Dirk Wright
(74) *Attorney, Agent, or Firm* — Faegre Drinker Biddle & Reath LLP

(57) ABSTRACT

A multistage wheel drive includes primary and secondary planetary stages, in which the ring gear of the primary (i.e., input-side) planetary stage is formed from a single machined part which also includes the planet gear carrier of the secondary (i.e., output-side) planetary stage. This dual-function "combination" component includes a splined exterior surface which interfaces with a correspondingly splined interior surface on the spindle in order to rotationally fix the combination component to the spindle. This arrangement ensures concentricity between the primary and secondary planetary stages, while allowing a desired amount of radial tolerance between the spindle, the combination component, and the hub of the wheel drive. In addition, the present arrangement can be produced efficiently and inexpensively.

21 Claims, 16 Drawing Sheets

(51) Int. Cl.
  *B60K 17/08* (2006.01)
  *F16D 1/10* (2006.01)
  *F16H 3/66* (2006.01)

(52) U.S. Cl.
  CPC .............. *F16H 1/46* (2013.01); *F16H 3/66* (2013.01); *F16D 2001/103* (2013.01); *F16H 2200/2007* (2013.01)

(56) References Cited

U.S. PATENT DOCUMENTS

| | | |
|---|---|---|
| 2,529,330 A | 11/1950 | Double |
| 3,115,204 A | 12/1963 | Dence |
| 3,125,363 A | 3/1964 | Kapusta |
| 3,150,532 A | 9/1964 | Bixby |
| 3,430,523 A | 3/1969 | Merritt |
| 3,686,978 A | 8/1972 | Knoblach et al. |
| 3,756,095 A | 9/1973 | McCay, Jr. et al. |
| 3,770,074 A | 11/1973 | Sherman |
| 3,951,481 A | 4/1976 | Ritter, Jr. |
| 4,020,716 A * | 5/1977 | Toth ............... B60K 17/046 475/337 |
| 4,037,694 A | 7/1977 | Keese |
| 4,043,226 A | 8/1977 | Buuck |
| 4,091,688 A | 5/1978 | Huffman |
| 4,142,615 A | 3/1979 | Sidles, Jr. et al. |
| 4,158,971 A | 6/1979 | Szalai et al. |
| 4,159,657 A | 7/1979 | Stilley |
| 4,186,626 A | 2/1980 | Chamberlain |
| 4,317,498 A | 3/1982 | Jirousek et al. |
| 4,330,045 A | 5/1982 | Myers |
| 4,334,590 A | 6/1982 | Plumb |
| 4,417,485 A | 11/1983 | Boor |
| 5,024,636 A | 6/1991 | Phebus et al. |
| 5,478,290 A | 12/1995 | Buuck et al. |
| 5,588,931 A | 12/1996 | Forster |
| 6,117,040 A | 9/2000 | Watterodt et al. |
| 6,290,048 B1 | 9/2001 | Kohlmeier et al. |
| 6,458,057 B2 | 10/2002 | Massaccesi et al. |
| 6,811,514 B2 | 11/2004 | Bowman |
| 6,814,684 B2 | 11/2004 | Schulz et al. |
| 7,530,416 B2 | 5/2009 | Suzuki |
| 8,062,160 B2 | 11/2011 | Shibukawa |
| 8,133,143 B2 | 3/2012 | Schoon |
| 8,500,591 B2 * | 8/2013 | Turner ............... B60K 17/046 180/343 |
| 9,303,727 B2 | 4/2016 | Reimann et al. |
| 9,950,562 B2 * | 4/2018 | Forrest ............... F16H 1/46 |
| 2001/0035012 A1 | 11/2001 | Smith |
| 2009/0032321 A1 | 2/2009 | Marsh et al. |
| 2009/0101376 A1 | 4/2009 | Walker et al. |
| 2009/0312134 A1 | 12/2009 | Schoon |
| 2010/0285914 A1 | 11/2010 | Wenthen |
| 2011/0130238 A1 | 6/2011 | Schoon |
| 2012/0196715 A1 | 8/2012 | Turner et al. |
| 2012/0202640 A1 | 8/2012 | Morimoto |
| 2012/0238389 A1 | 9/2012 | Schoon |
| 2013/0161148 A1 | 6/2013 | Schoon |
| 2015/0273940 A1 | 10/2015 | Forrest et al. |

OTHER PUBLICATIONS

European Search report issued in corresponding European Application No. 16 91 3598, dated Apr. 9, 2020. 6 pages.

* cited by examiner

FIG_2

FIG_3

FIG_10

WHEEL DRIVE TRANSMISSION

CROSS-REFERENCE TO RELATED APPLICATIONS

The present application is a national phase filing under 35 U.S.C. § 371 of International Patent Application No. PCT/US2016/047038, entitled "WHEEL DRIVE TRANSMISSION" and filed Aug. 15, 2016, the entire disclosure of which is hereby expressly incorporated by reference herein.

BACKGROUND

1. Technical Field

The present disclosure relates to vehicle power transmission units, and, more particularly, to wheel-mounted gear reduction units.

2. Description of the Related Art

Wheel drives are used to provide gear reduction at or near the point of service, such as at the hub of a driven wheel. Wheel drives may be used for the large driven wheels commonly found on construction equipment and earth moving vehicles, for example, or for auger bits used in drilling post holes in the ground.

International Patent Application Publication No. WO 2014/065851 describes a wheel drive arranged to provide a wide axial spacing between the internal bearings used to rotatably support the hub of the wheel drive on the spindle thereof. This wide axial spacing and other features of the wheel drive provide reduced torque and stress on the bearings during service, thereby enabling the bearings to absorb heavier loads while supporting a driven wheel mounted to the hub of the wheel drive. The wheel drive includes primary and secondary planetary reduction stages which operate to respectively reduce the speed and increase the torque applied to the hub (and wheel). Each planetary stage includes a ring gear and a sun gear with a plurality of planet gears disposed therebetween and supported by a planet gear carrier.

The wheel drive described in WO 2014/065851 utilizes a spindle which is integrally and monolithically formed as a single part together with the primary stage ring gear and secondary stage planet carrier. This monolithically formed spindle, ring gear and planet carrier is a large and complex part which may complicate the production and assembly of the wheel drive in some configurations.

SUMMARY

The present disclosure provides a multistage wheel drive including primary and secondary planetary stages, in which the ring gear of the primary (i.e., input-side) planetary stage is formed from a single machined part which also includes the planet gear carrier of the secondary (i.e., output-side) planetary stage. This dual-function "combination" component includes a splined exterior surface which interfaces with a correspondingly splined interior surface on the spindle in order to rotationally fix the combination component to the spindle. This arrangement ensures concentricity between the primary and secondary planetary stages, while allowing a desired amount of radial tolerance between the spindle, the combination component, and the hub of the wheel drive. In addition, the present arrangement can be produced efficiently and inexpensively.

In one form thereof, the present disclosure provides a speed-reducing transmission unit including: a spindle defining a longitudinal spindle axis, the spindle configured to affix to a frame at an input side of the transmission unit; a hub defining a longitudinal hub axis, the hub rotatable with respect to the spindle about the longitudinal hub axis and configured to affix to a driven structure at an output side of the transmission unit; and a planetary reduction assembly. The planetary reduction assembly includes: a primary planetary stage functionally interposed between the spindle and the hub, the primary planetary stage comprising a plurality of primary components including a primary sun gear, a primary planet gear carrier, a primary planet gear in splined engagement with the primary sun gear and rotatably attached to the primary planet gear carrier, and a primary ring gear in splined engagement with the primary planet gear; a secondary planetary stage functionally interposed between the spindle and the hub, the secondary planetary stage comprising a plurality of secondary components including a secondary sun gear, a secondary planet gear carrier, a secondary planet gear in splined engagement with the secondary sun gear and rotatably attached to the secondary planet gear carrier, and a secondary ring gear in splined engagement with the secondary planet gear, one of the plurality of primary components comprising a primary input and another of the plurality of primary components comprising a primary output, and one of the plurality of secondary components comprising a secondary input and another of the plurality of secondary components comprising a secondary output, the primary output operably coupled to the secondary input such that the primary planetary stage and the secondary planetary stage cooperate to produce a final speed reduction between the spindle and the hub; and a combination component selectively rotatably fixable to the spindle, the combination component having one of the plurality of primary components and one of the plurality of secondary components integrally formed as a part thereof.

In another form thereof, the present disclosure provides a planetary reduction assembly including a primary planetary stage, a secondary planetary stage, and a combination component. The primary planetary stage includes: a primary sun gear configured and positioned as a primary power input for the primary planetary stage; a primary planet gear carrier configured and positioned as a primary power output for the primary planetary stage; a primary planet gear in splined engagement with the primary sun gear and rotatably attached to the primary planet gear carrier; and a primary ring gear in splined engagement with the primary planet gear. The secondary planetary stage includes: a secondary sun gear rotatably fixed to the primary planet gear carrier, such that the secondary sun gear is a secondary power input for the secondary planetary stage; a secondary planet gear carrier; and a secondary planet gear in splined engagement with the secondary sun gear and rotatably attached to the secondary planet gear carrier. The combination component is monolithically formed as a single part and comprising the primary ring gear at a first axial end and the secondary planet gear carrier at a second axial end opposite the first axial end.

In yet another form thereof, the present disclosure provides a method of manufacturing a speed-reducing transmission unit, the method including: installing a primary planetary stage at a first axial end of a monolithically formed combination component; installing a secondary planetary stage at a second axial end of the monolithically formed combination component opposite the first axial end, such that the primary and secondary planetary stages are operably linked and cooperate to produce a final speed reduction between an input and an output of the transmission unit; and rotatably fixing the monolithically formed combination component to a spindle.

In yet another form thereof, the present disclosure provides a method of servicing a wheel drive having a spindle fixed to a vehicle, a hub rotatable with respect to the spindle, and a wheel fixed to the hub, the wheel driving further including a planetary reduction assembly operably interposed between the spindle and the hub, the method including: removing a cover from the wheel drive to expose an otherwise enclosed interior of the wheel drive; and withdrawing a combination component having components of the planetary reduction assembly from the interior of the wheel drive, while leaving the hub fixed to the vehicle and the wheel fixed to the hub.

BRIEF DESCRIPTION OF THE DRAWINGS

The above-mentioned and other features and advantages of the present disclosure, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplifications set out herein illustrate embodiments of the disclosure and such exemplifications are not to be construed as limiting the scope of the invention in any manner.

DETAILED DESCRIPTION

Figure 1:
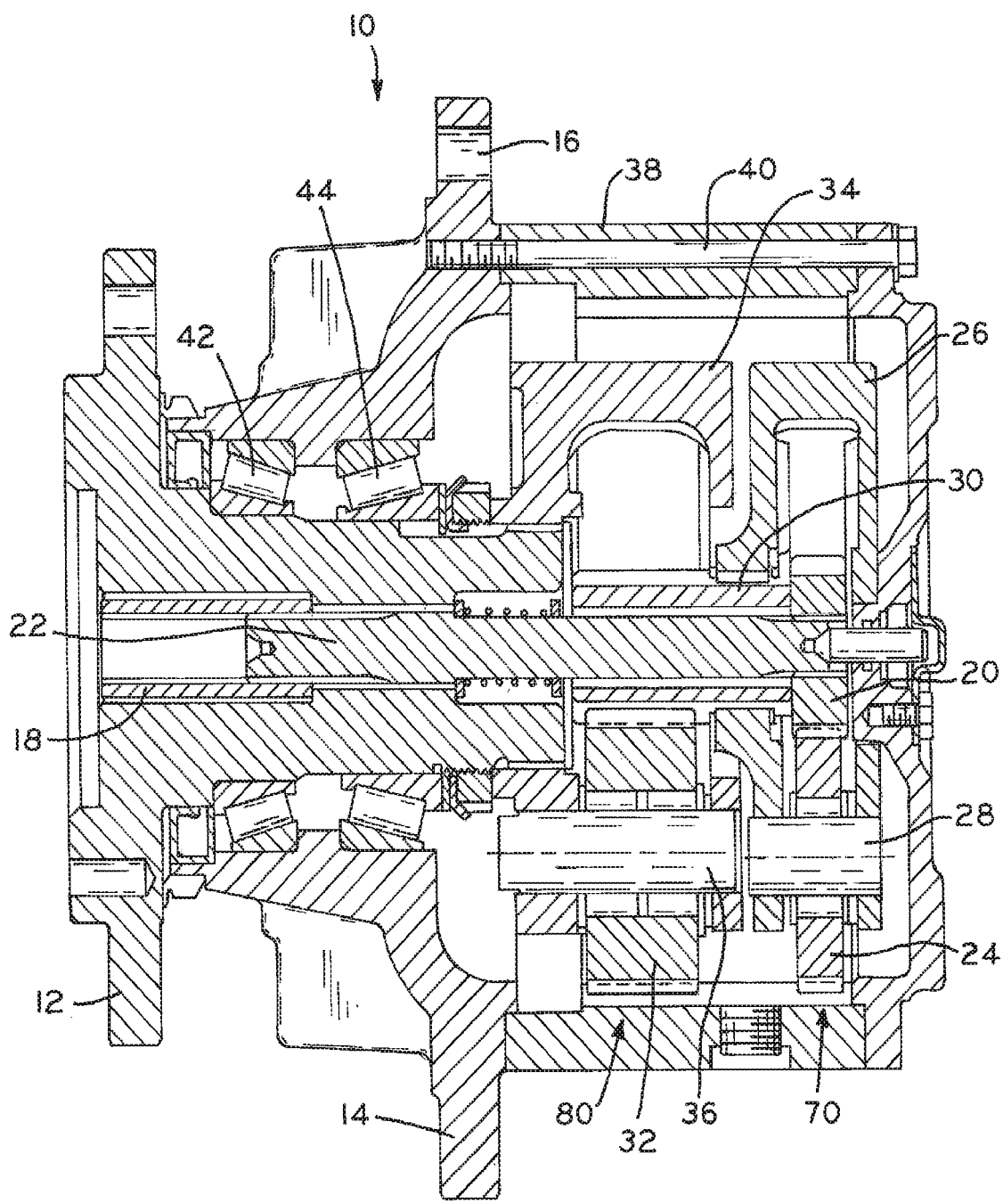
FIG. 1 is a cross-sectional, elevation view of a known wheel drive.

As shown in FIGS. 11-14 wheel drive 310 includes hub 314 rotatably mounted to spindle 312, with a gear reduction system including primary stage 370 and secondary stage 380. Combination component 340 is a single, monolithic part incorporating one of the functional components of each stage 370, 380, thereby linking the two planetary stages 370, 380 to create planetary reduction assembly 360 as described in detail below. Combination component 340 also mounts to spindle 112 in a rotatably fixed configuration via splined connection 366, which provides some tolerance to allow for wear in roller bearings 342, 344 and also described further below.

Wheel drives 110, 210 are also described below, each including a monolithic spindle 112 and no analog to combination component 240. The features of wheel drives 110, 210 and 310 and interchangeable with one another, in that each individual feature of wheel drives 110, 210 or 310 may be incorporated into any of the other wheel drives 110, 210 or 310 except as otherwise noted herein.

Various components of wheel drives 110, 210, 310 have a generally cylindrical shape, including spindles 112, 212, 312, hubs 114, 214, 314, combination component 340, brake systems 121, 221 and their related components, input components 117, 217, 317, primary gear carrier 126, 226, 326, bearings 142, 242, 342, 144, 244, 344, primary/secondary coupler component 129, 229, ring gears 138, 238, 338, housing 341, seals 146, 246, 346 and outer covers 148, 248, 348. These components define respective longitudinal axes that are coaxial with longitudinal axis $A_1$ when each respective wheel drive 110, 210, 310 is assembled as shown in FIGS. 2, 4, 9, 11 and 12.

1. Overview of Wheel Drive Components and Operation

Figure 3:
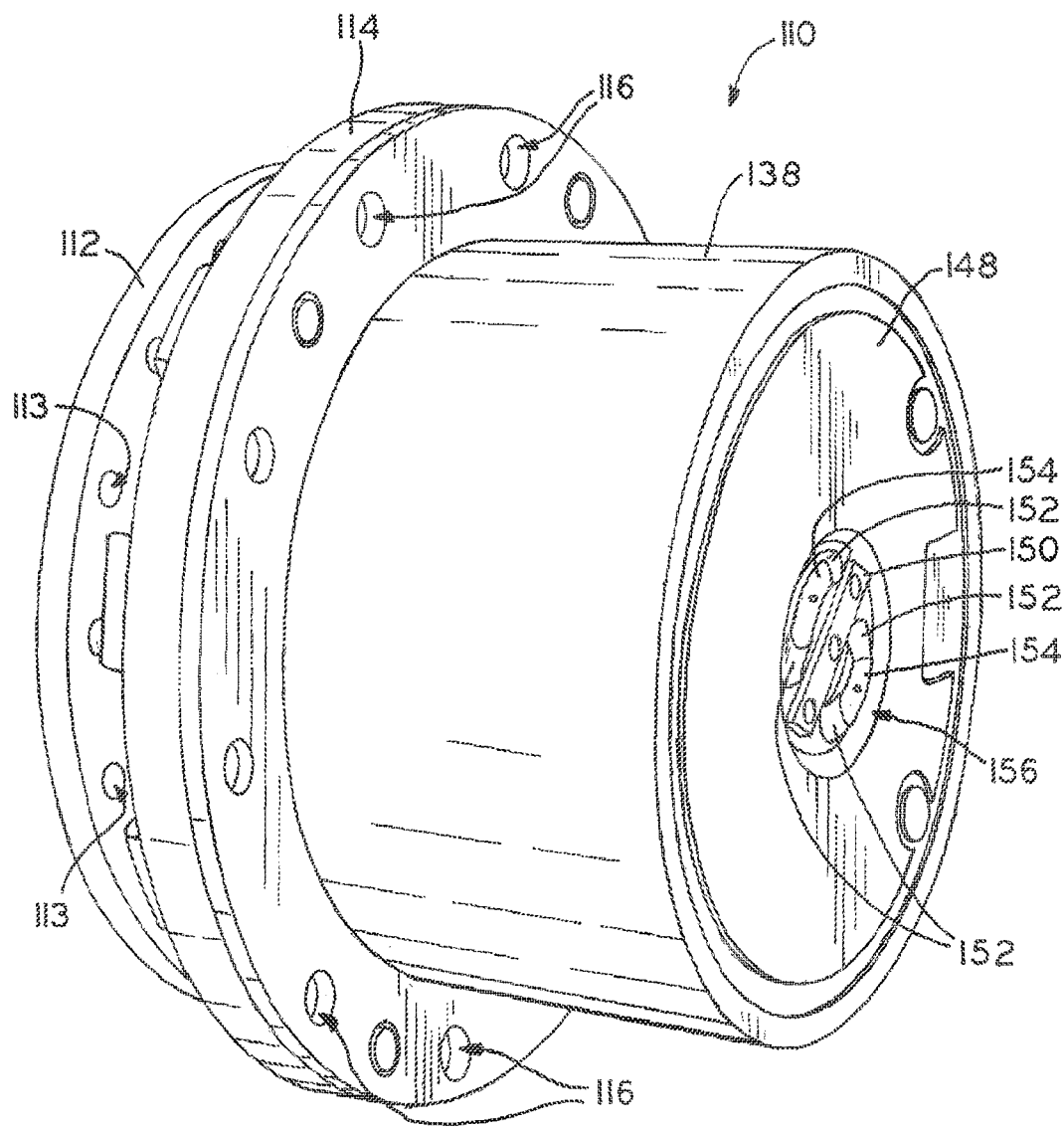
FIG. 3 is an output-side, perspective view of the wheel drive shown in FIG. 2.

As best seen in FIG. 3, wheel drive 110 includes spindle 112, which affixes to a vehicle frame F (FIG. 10) via mounting holes 113, and hub 114, which affixes to a driven wheel W via mounting holes 116 and rotates with respect to spindle 112 about longitudinal axis $A_1$ of wheel drive 110. Driven wheel W and wheel hub 114 are also affixed to ring gear 138, as described further below, such that wheel W and wheel hub 114 are powered by rotation of ring gear 138 about axis $A_1$. In other embodiments, wheel drive 110 may be used as speed reducer for other driven components or devices, such as augers.

Figure 2:
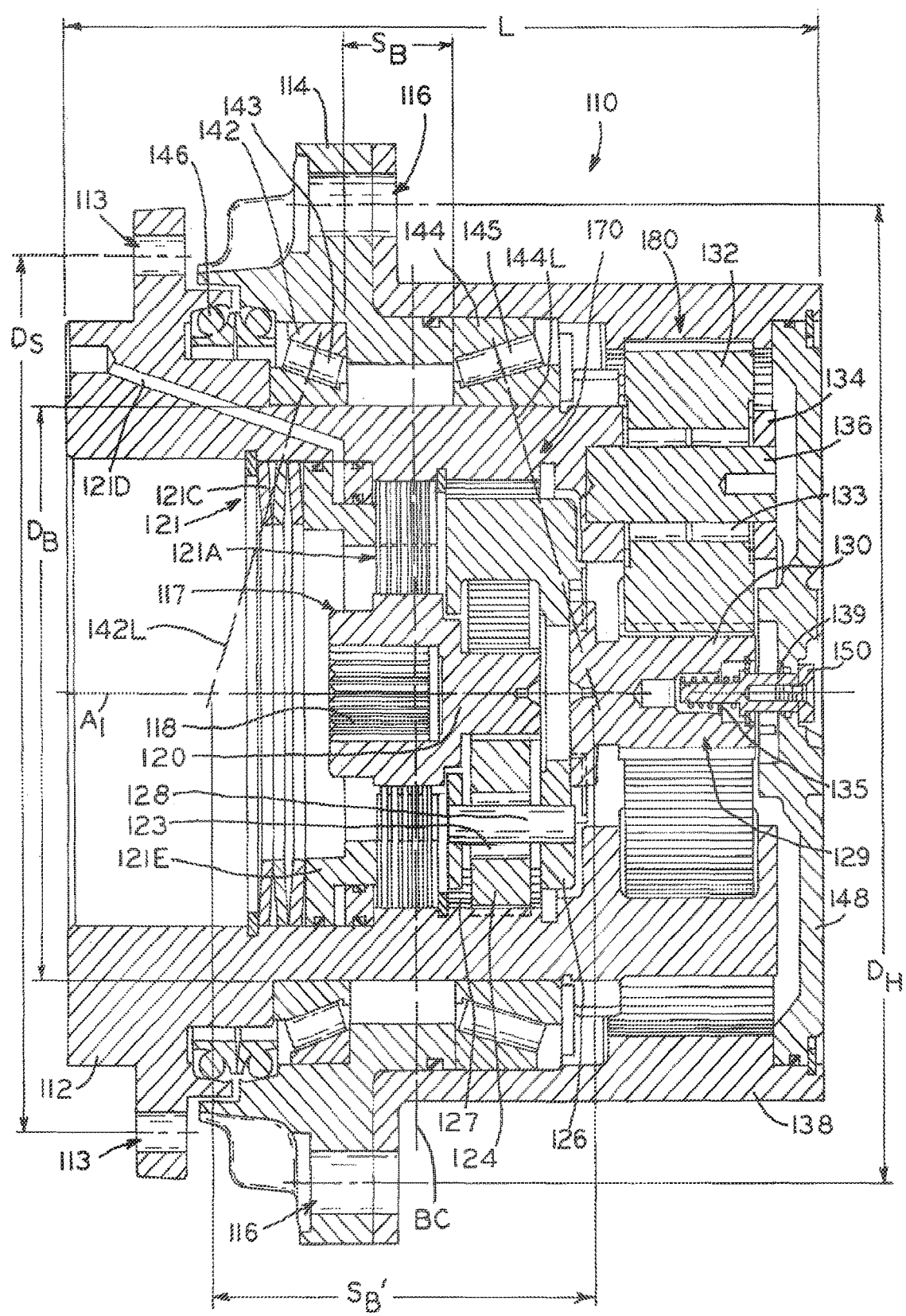
FIG. 2 is a cross-sectional, elevation view of a two-stage wheel drive made in accordance with the present disclosure.

Referring to FIG. 2, wheel hub 114 is rotatably mounted to spindle 112 via roller bearings 142, 144. Input-side bearing 142 is disposed between, and directly abuts the outer surface of spindle 112 and an inner surface of hub 114. Output-side bearing 144 is also mounted upon and directly abuts the outer surface of spindle 112 as illustrated, but is abutted at its radial outward surface by ring gear 138 rather than hub 114. Thus, input-side bearing 142 is both axially constrained (i.e., prevented from axial movement) and radially constrained (i.e., prevented from radially outward movement or expansion) by cooperation of adjacent surfaces of spindle 112 and hub 114. However, output-side bearing 144 is only axially constrained by spindle 112 and hub 114, while radial constraint is provided by ring gear 138. As described in further detail below, bearings 142, 144 define a wide nominal spacing $S_B$ (and an associated wide functional spacing $S_B'$) with respect to one another as measured parallel to axis $A_1$, which enhances the ability of drive 110 to absorb external loads during service.

Wheel drive 110 includes two planetary gear stages, namely primary planetary stage 170 and secondary planetary stage 180, which each contribute to the overall gear reduction between input component 117 and ring gear 138. Primary planetary stage 170 receives powered input from input component 117 and produces an intermediate output having reduced rotational speed and concomitantly higher torque as compared to input component 117. As described in further detail below, this intermediate output selectively provides the powered input to secondary planetary stage 180, by selectively rotationally fixing primary planet gear carrier 126 (which is the output component of primary stage 170) to secondary sun gear 130 (which is the input component of secondary stage 180). Secondary planet stage 180 in turn produces a final output having reduced rotational speed and increased torque with respect to the intermediate output of primary planetary stage 170. The final output is transmitted to ring gear 138, which is fixed to wheel hub 114.

Figure 9:
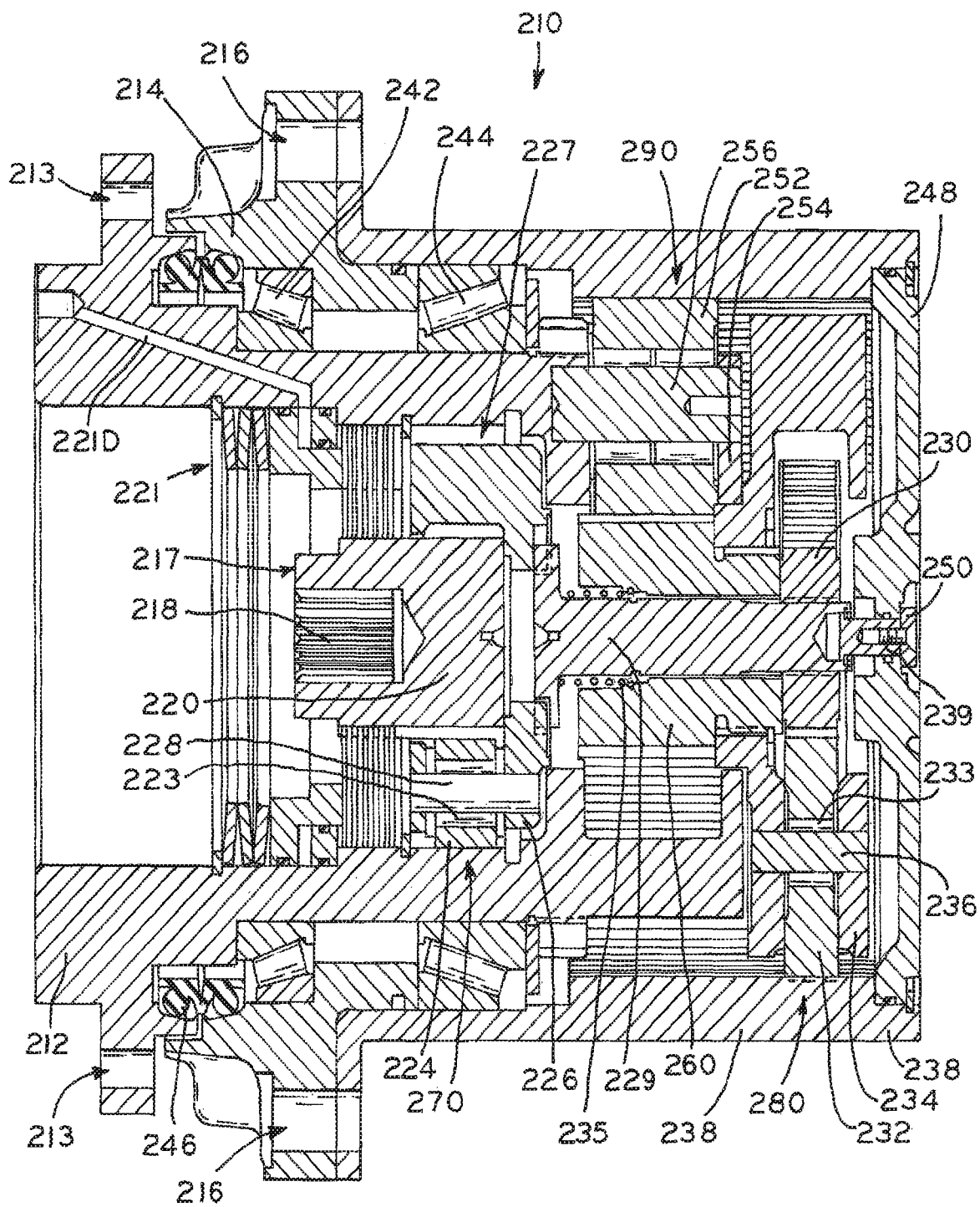
FIG. 9 is a cross-sectional, elevation view of a three-stage wheel drive made in accordance with the present disclosure.

Thus, the final output of wheel drive 110 rotates driven wheel W (FIG. 10) at a rotational speed that has been reduced twice—once by each of the two planetary stages 170, 180. This double reduction arrangement establishes wheel drive 110 as a "two stage" system, though it is contemplated that systems with other reduction mechanisms may be used. For example, a single stage wheel drive having only one planetary stage may be used in designs requiring relatively smaller overall reduction ratios, while multiple-stage wheel drives having three or more stages may be used where larger overall reduction ratios are desired. Where a single-stage wheel drive is desired, a ring gear may form the output component (as is the case with secondary stage 180 described herein), or a planet gear carrier may form the output component (as is the case with primary stage 170 described herein). A three-stage wheel drive 210 is shown in FIG. 9 and described further below.

Figure 4:
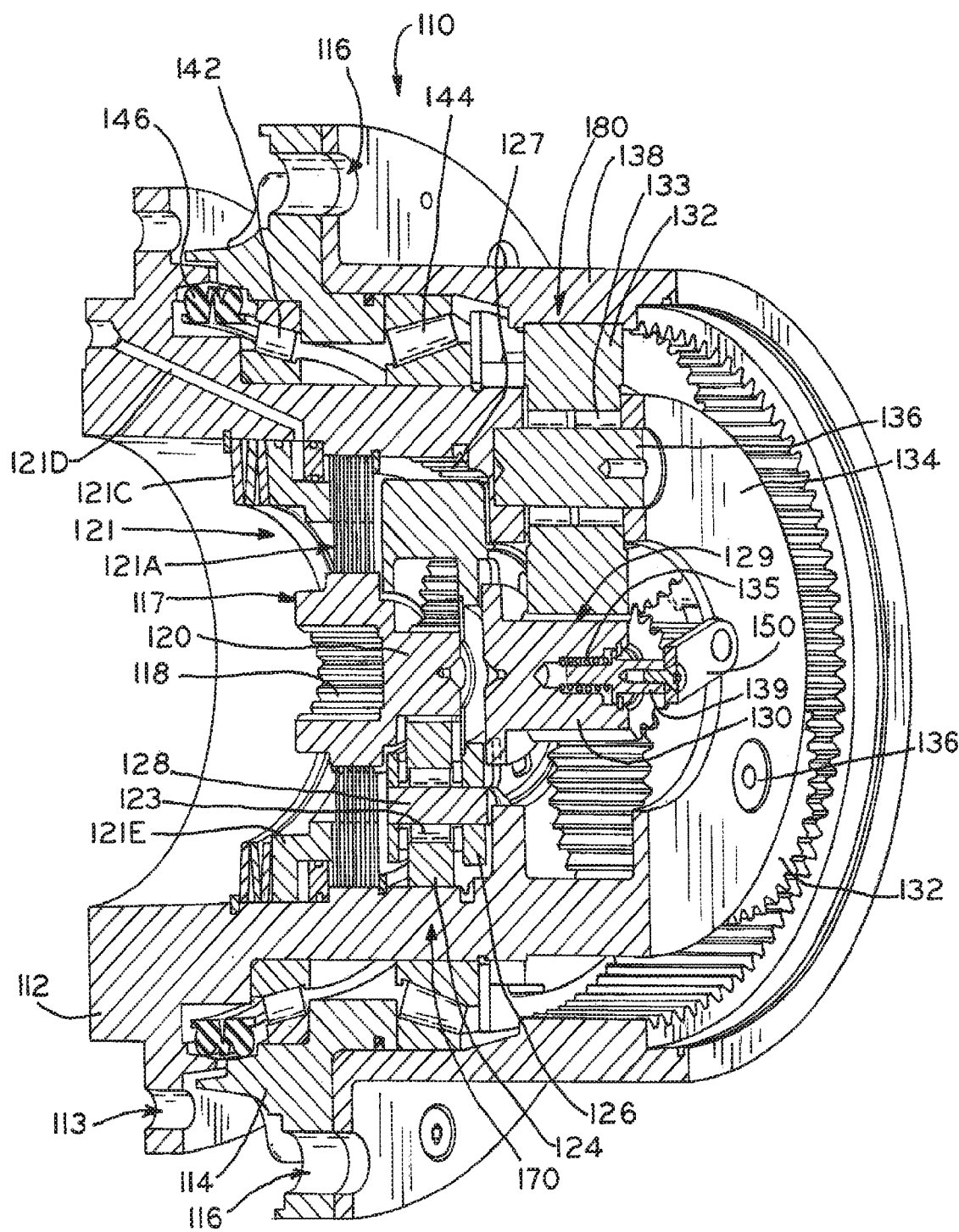
FIG. 4 is an output-side, perspective, cross-sectional view of the wheel drive shown in FIG. 2, in which the wheel drive cover has been removed for clarity.
Figure 6A:
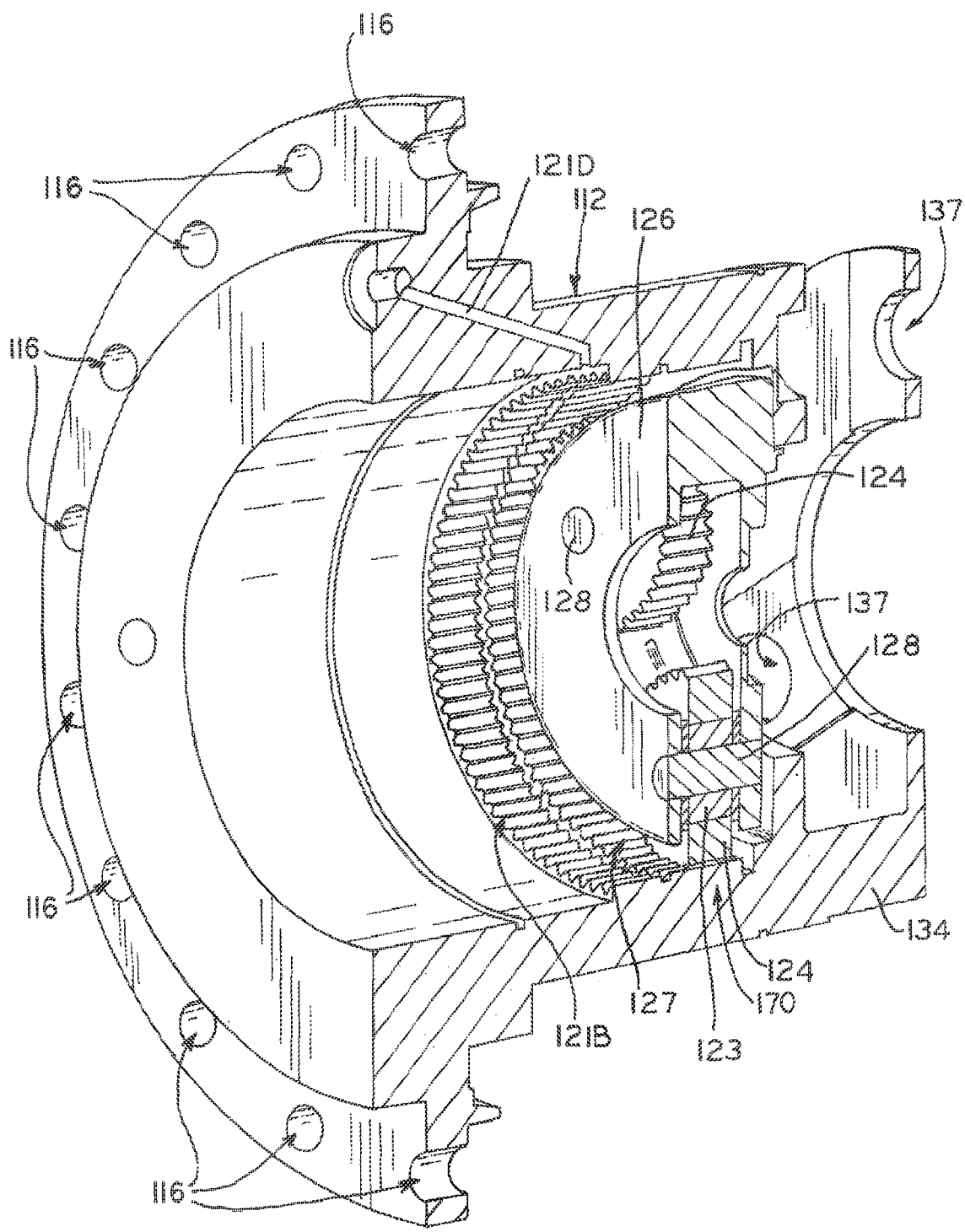
FIG. 6A is an input-side, perspective, cross-sectional view of the spindle shown in FIG. 5, together with the primary planetary stage components from the wheel drive of FIG. 2.

Turning to FIGS. 2 and 4, the configuration of both primary planetary stage 170 and secondary planetary stage 180 is illustrated. First, primary planetary stage 170 receives power from input component 117 which includes input coupler 118 and sun gear 120 monolithically formed as a single part. An externally splined input shaft (not shown) transmits power from a vehicle power source to the internal splines of input coupler 118 to rotate sun gear 120. External splines formed on sun gear 120 engage correspondingly formed external splines on a plurality of planet gears 124, such as three planet gears 124 in the illustrated embodiment. Only two planet gears 124 are visible within the cross sectional views of FIGS. 2, 4 and 6A, it being understood that a lower planet gear 124 is shown in section, an upper planet gear 124 is shown behind the cross sectional plane and partially obscured by sun gear 120, and a second upper planet gear is not shown in the sectioned view. As best shown in FIG. 6, the external splines of planet gears 124 also engage ring gear 127, which is integrally formed along the inner wall of spindle 112 as further described below. Planet gears 124 are held in their respective positions by planet gear carrier 126, and are rotatable about the respective planet gear longitudinal axes via planet gear axles 128. Bearings 123 may be interposed between planet gears 124 and axles 128 to facilitate rotation therebetween.

Rotation of sun gear 120 causes planet gears 124 to rotate about planet gear axles 128, as well as to rotate about longitudinal axis $A_1$ within stationary ring gear 127. Because spindle 112 is mounted to the vehicle frame F (FIG. 10) and ring gear 127 is monolithically formed as part of spindle 112, ring gear 127 is a stationary component in the context of primary planetary stage 170 and wheel drive 110. Accordingly, planet gears 124 are free to circumnavigate sun gear 120 while rotating about axis $A_1$ and, in doing so, cause primary gear carrier 126 to rotate about axis $A_1$ at the speed of such circumnavigation. Primary gear carrier 126 is selectively rotatably fixed to sun gear 130, and therefore provides the input to drive rotation of secondary planetary stage 180, as further detailed below.

Figure 5:
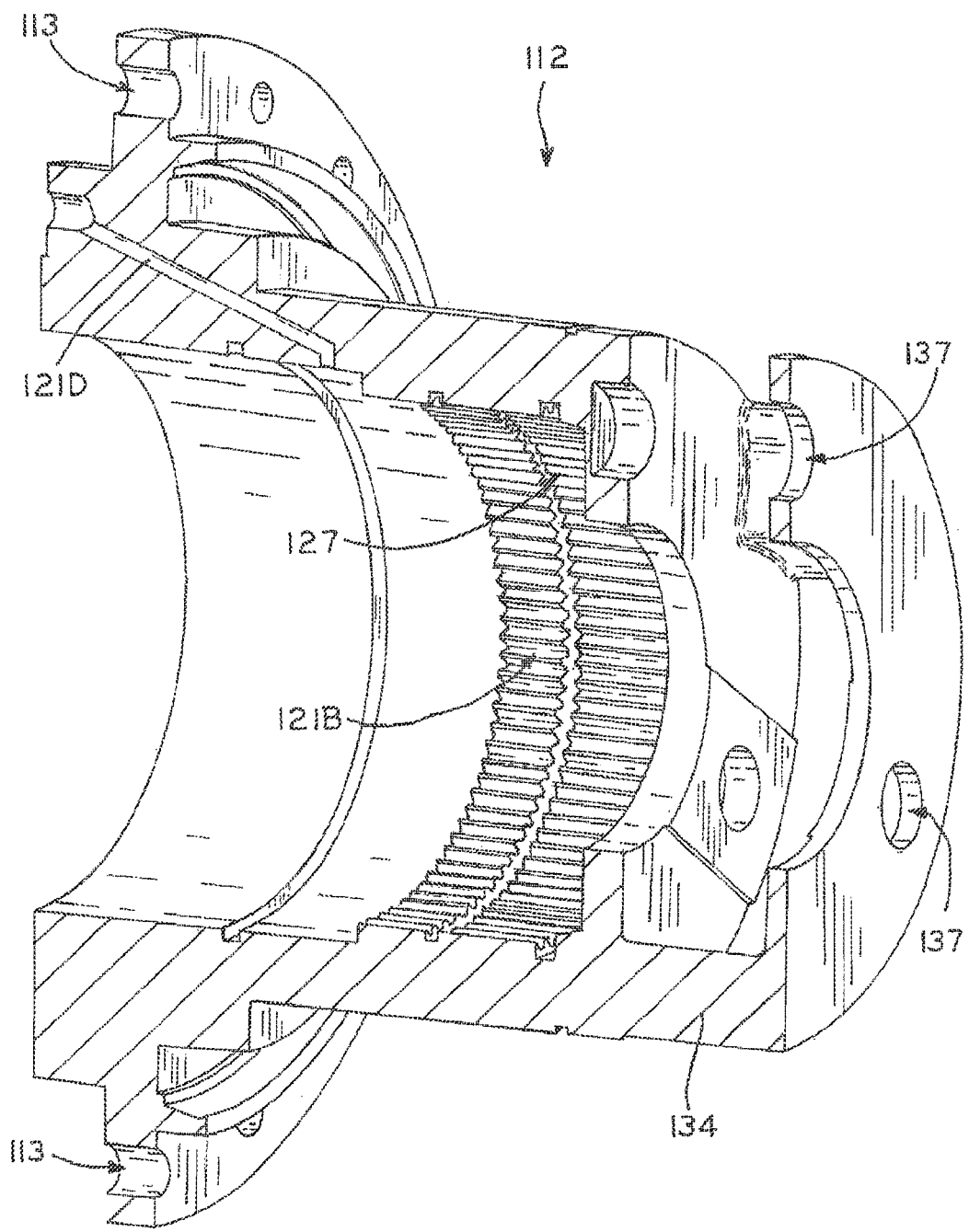
FIG. 5 is an output-side, perspective, cross-sectional view of the spindle of the wheel drive shown in FIG. 2.
Figure 6B:
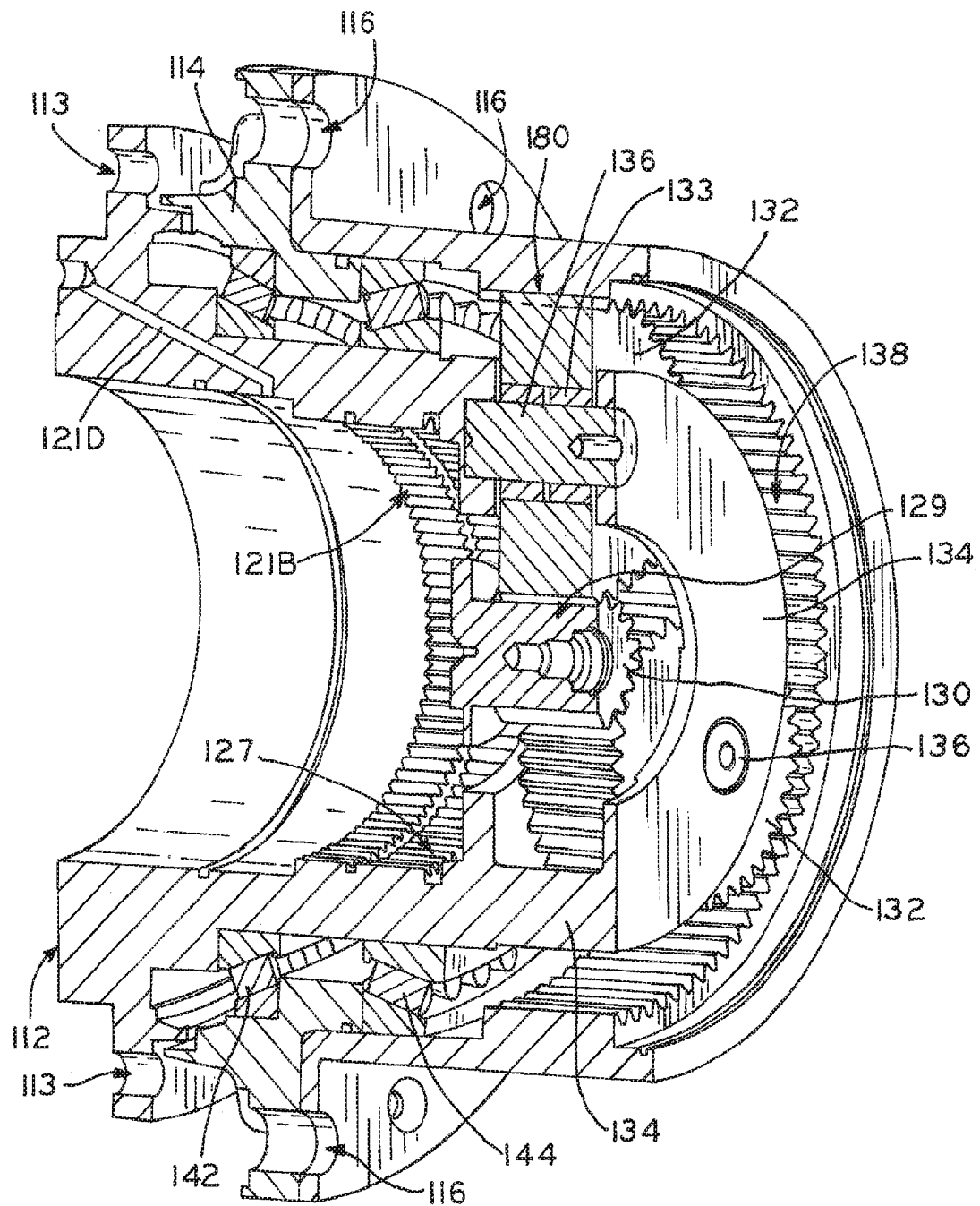
FIG. 6B is an output-side, perspective, cross-sectional view of the spindle and primary planetary stage shown in FIG. 6B, together with the secondary planetary stage and related components.

Turning to FIGS. 5 and 6B, secondary planetary stage 180 is arranged similarly to primary planetary stage 170. As described further below, however, secondary planetary stage 180 includes gear carrier 134 which is integrally and monolithically formed as a part of spindle 112, and is therefore stationary in the context of wheel drive 110. For secondary planetary stage 180, ring gear 138 is the rotatable component which serves as the output of secondary stage 180.

Similar to primary stage 170 described above, external splines of secondary sun gear 130 engage with external splines formed on each of three planet gears 132 which are in turn engaged with the internal splines formed in ring gear 138. Like primary stage 170, only two planet gears 132 are visible in the cross-sectional views of FIGS. 2, 4 and 6B, with the upper planet gear 132 shown in section and the lower planet gear 132 partially obscured by adjacent components. Rotation of secondary sun gear 130 causes planet gears 132 to rotate about planetary gear axles 136, but such rotation cannot cause circumnavigation of planet gears 132 about axis $A_1$ because planet gear carrier 134 is fixed as noted above. Instead, rotation of planet gears 132 drives rotation of ring gear 138. Thus, unlike primary stage 170 with stationary ring gear 127 and gear carrier 126 as the output component, secondary stage 180 utilizes ring gear 138 as its output component while gear carrier 134 remains stationary. Bearings 133 may be interposed between planet gears 132 and axles 136 to facilitate rotation therebetween.

Spindle 112 therefore serves multiple roles in wheel drive 110, including the role of a stationary component in each of the planetary stages 170, 180 (i.e., ring gear 127 and planet gear carrier 134 respectively). For clarity, FIG. 5 illustrates spindle 112 in cross-section without other components, while FIGS. 6A and 6B show spindle 112 with only primary and secondary planetary stages 170, 180 respectively.

As most clearly illustrated in FIGS. 5 and 6A, stationary ring gear 127 is integrally formed in spindle 112 for interaction with the other components of primary planetary stage 170. Unlike spindle 12 of wheel drive 10, spindle 112 of wheel drive 110 encircles primary planetary stage 170. FIGS. 5 and 6B illustrate that gear carrier 134 as an integrally, monolithically formed part of spindle 112, with gear carrier 134 receiving planetary gear axles 136 through axle apertures 137 (FIG. 5). In short, spindle 112 serves as both a housing and a support structure for both planetary stages 170, 180, with primary planetary stage 170 axially rotating within the cavity of spindle 112 and secondary planet gears 132 rotating about gear axles 136 received within apertures 137 formed in spindle 112 (FIG. 5). As described in further detail below, this arrangement of components moves primary planetary stage 170 into spindle 112 such that the space radially outside of spindle 112 normally occupied by primary stage 170 is made available, which in turn allows output-side bearing 144 to occupy the space normally occupied by primary stage 170.

Wheel drive 110 may be used outside, and may therefore be exposed to the elements. Wheel drive 110 includes seal 146, best shown in FIG. 2, disposed between hub 114 and spindle 112. Referring to FIGS. 2 and 3, outer cover 148 is fitted on the axial outward end of ring gear 138. Seal 146 and outer cover 148 cooperate to retain lubricant contained within wheel drive 110, while also preventing dust, moisture, and other contaminants from infiltrating the interior of wheel drive 110.

As best seen in FIG. 2, wheel drive 110 optionally includes brake system 121 operable to selectively arrest rotation of input component 117. Clutch pack 121A includes alternating clutch plates engaging inner splines 121B (FIG. 5) formed on the inner surface of spindle 112 or outer splines formed on coupler portion 118 of input component 117. Springs 121C, which may be provided as Belleville-type springs, urge clutch release component 121E into engagement with clutch pack 121A, biasing the alternating clutch plates into abutting engagement with one another. This creates frictional resistance to rotation of input component 117. Hydraulic line 121D selectively provides pressurized fluid to move clutch release component 121E axially toward the input side of wheel drive 110, against the biasing force of springs 121C. This allows the clutch plates of clutch pack 121A to spread apart from one another, relieving the friction therebetween and allowing input component 117 to rotate.

2. Combination Component

Figure 11:
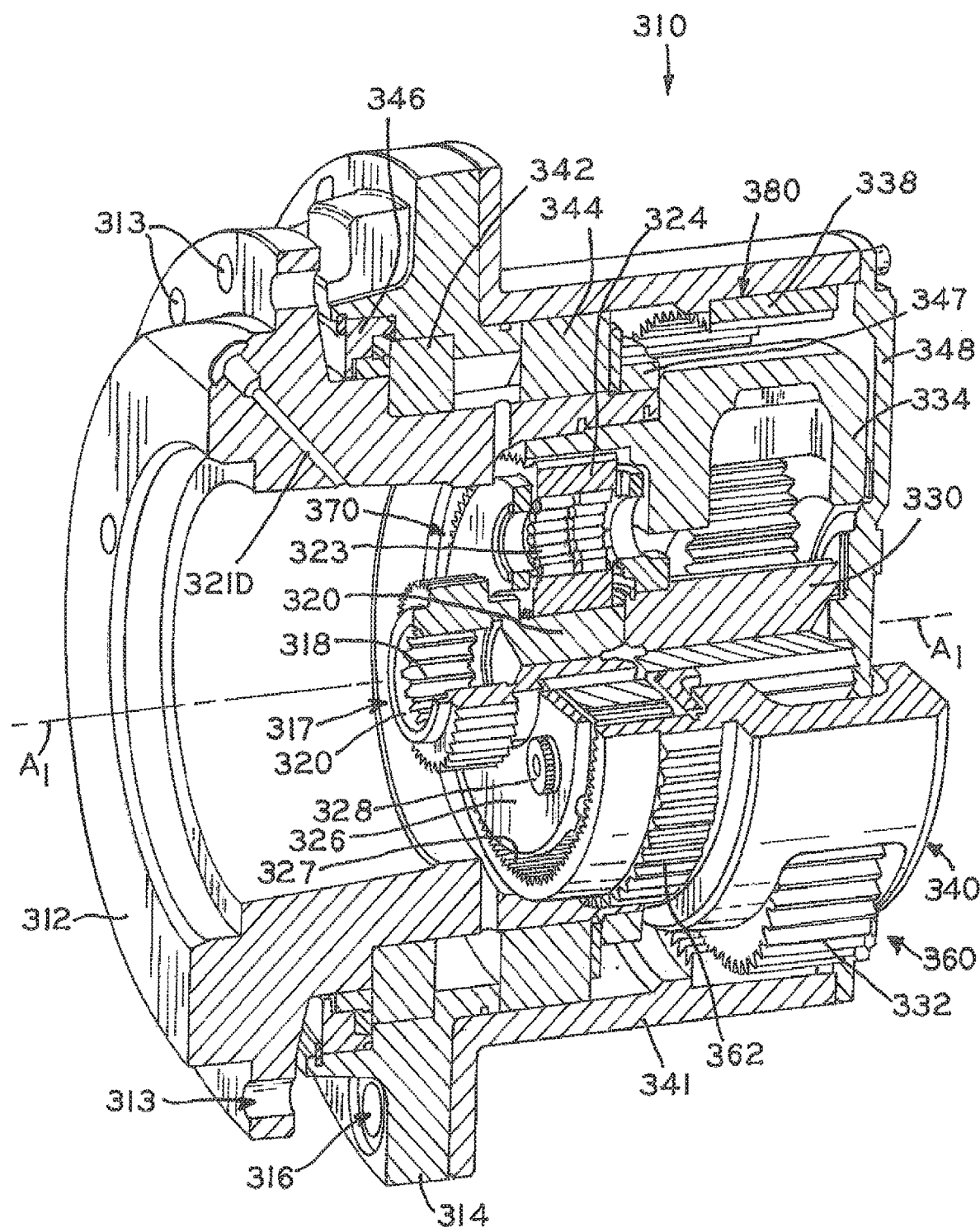
FIG. 11 is a cross-section, perspective view of another wheel drive in accordance with the present disclosure, including a planetary reduction subassembly selectively rotatably fixable to the wheel drive spindle.
Figure 12:
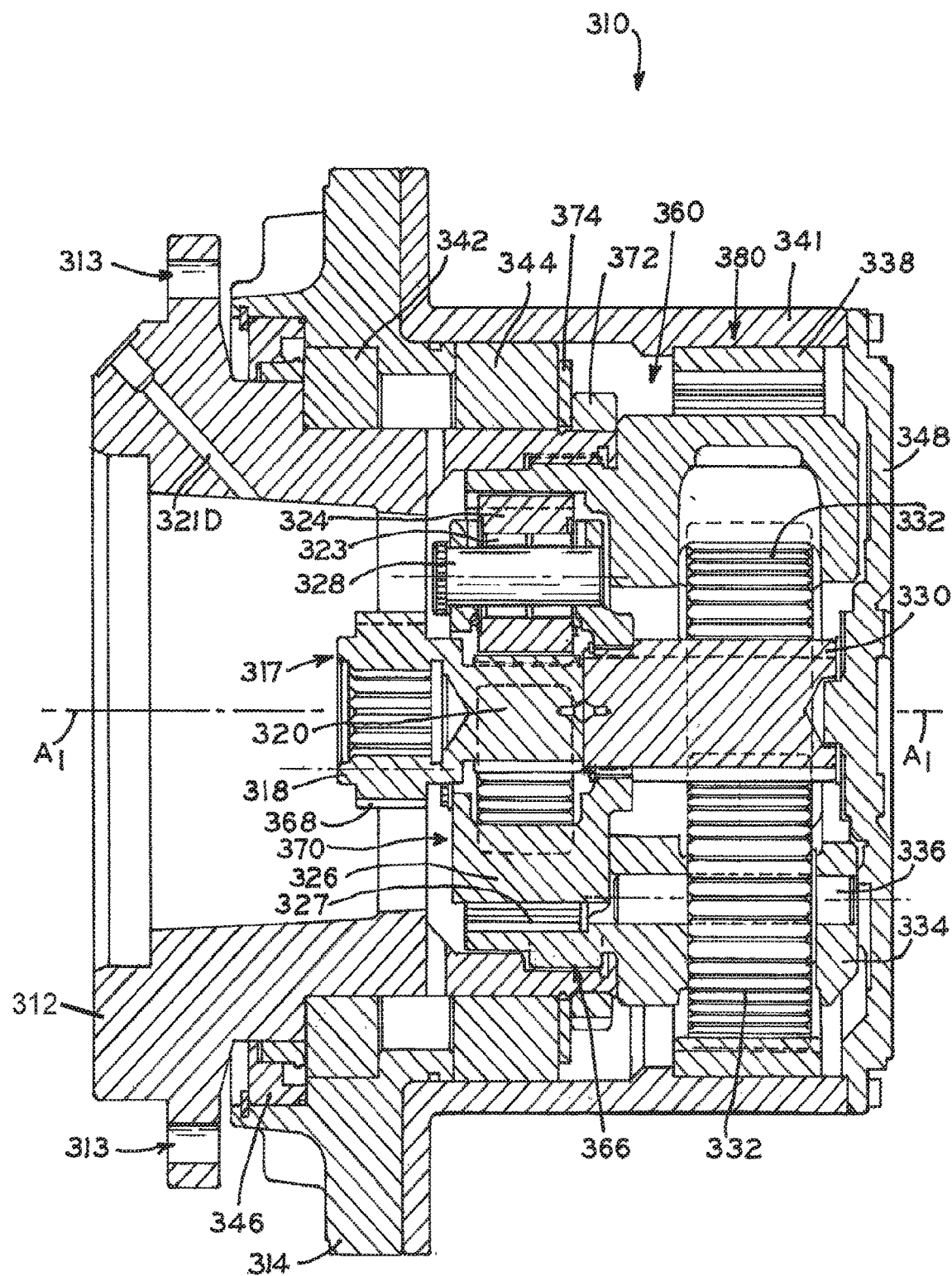
FIG. 12 is a cross-section, elevation view of the wheel drive shown in FIG. 11.

Referring now to FIGS. 11 and 12, wheel drive 310 includes planetary reduction assembly 360 including combination component 340, primary planetary stage 370 and secondary planetary stage 380. Combination component 340 provides a framework for supporting and aligning the components of planetary stages 370, 380, and allows assembly 360 to be integrated into the final assembly of wheel drive 310 as a self-contained unit. In the illustrated embodiment and as further described below, primary ring gear 327 of primary planetary stage 370 and planet gear carrier 334 of secondary planetary stage 380 are integrally formed as a part of combination component 340, which is a monolithic part. With the exception of secondary ring gear 338, planetary reduction assembly 360 includes all the additional components of primary and secondary planetary stages 370 and 380 which can be separately assembled and integrated into wheel drive 310 via a splined connection 366 with spindle 312 (FIG. 12). Further details of the assembly and implementation of wheel drive 310 are described in further detail below.

Except as otherwise noted herein, reference numbers used to refer to components of wheel drive 310 are correspondingly used in reference to wheel drives 110, 210 described herein, except with 100 and 200 added thereto respectively. The features of wheel drives 110, 210 and 310 may be used in any combination or permutation as required or desired for a particular application.

However, unlike the single, monolithic component shown in wheel drives 110, 210 including a spindle (112, 212), primary ring gear (127, 227) and secondary planet carrier (134, 234), spindle 312 of wheel drive 310 is a separate component from combination component 340 and is selectively rotatably fixed thereto via splined connection 366, as shown in FIG. 12. As described in further detail below, this configuration both simplifies the manufacture and assembly of wheel drive 310, while also providing enhanced operation and function during operation of wheel drive 310.

Figure 13:
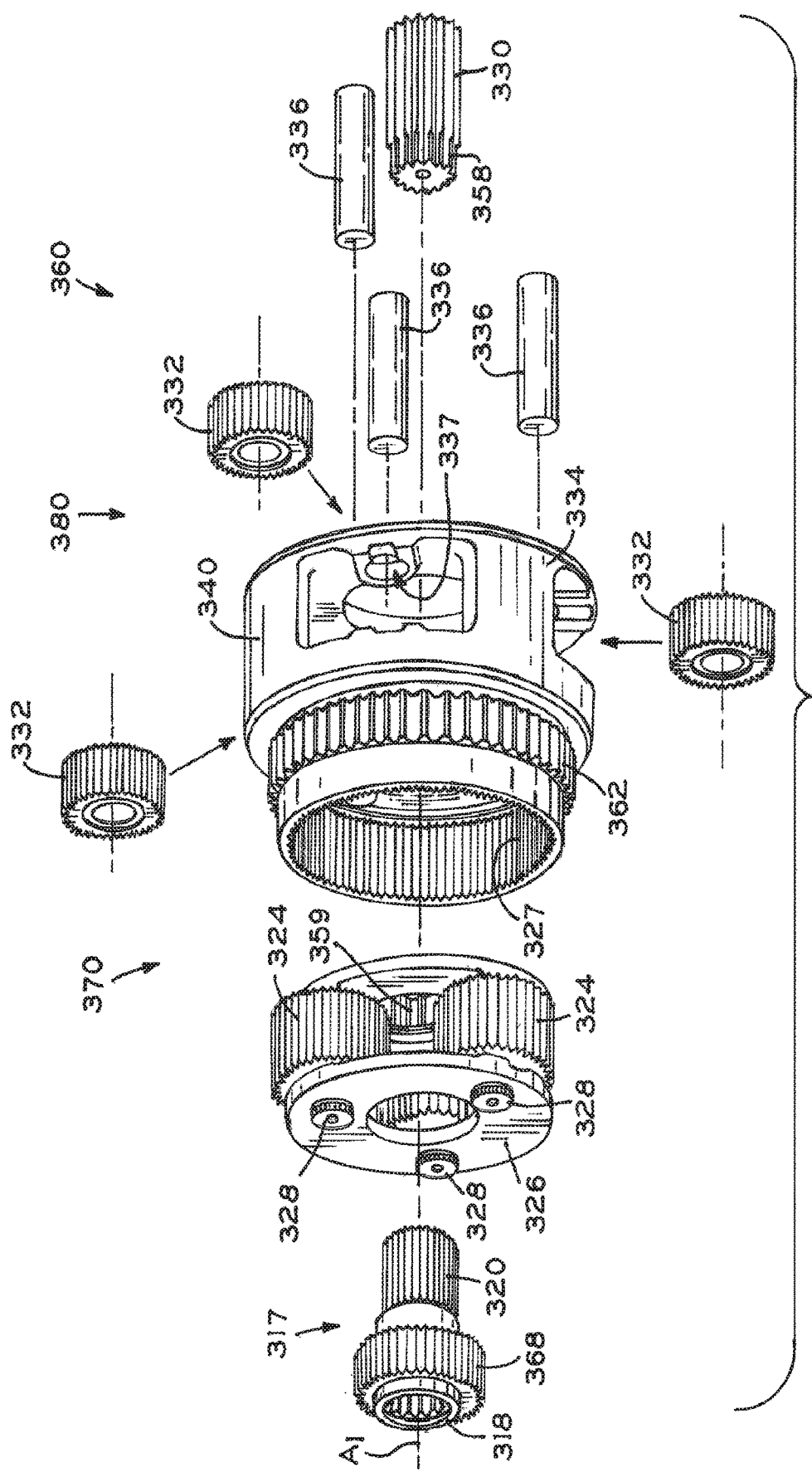
FIG. 13 is an exploded view of the planetary reduction subassembly used in the wheel drive of FIG. 11, illustrating a combination component and planetary reduction components which mount thereto.

To assemble primary planetary stage 370, planet gears 324 are first rotatably coupled to planet gear carrier 326 via axles 328 as illustrated in FIG. 13. Bearings 323 may be interposed between axles 328 and each respective planet gear 324, as shown in FIGS. 11 and 12. The resulting subassembly includes planet gears 324, carrier 326 and axles 328, which is then axially received into primary ring gear 327 disposed immediately adjacent the input-side axial end of component 340. As shown by a comparison of FIGS. 13 and 14, the exterior teeth of each respective planet gear 324 intermesh with the adjacent interior teeth of ring gear 327 as the subassembly is advanced into component 340 to the fully seated position of FIG. 14.

Figure 14:
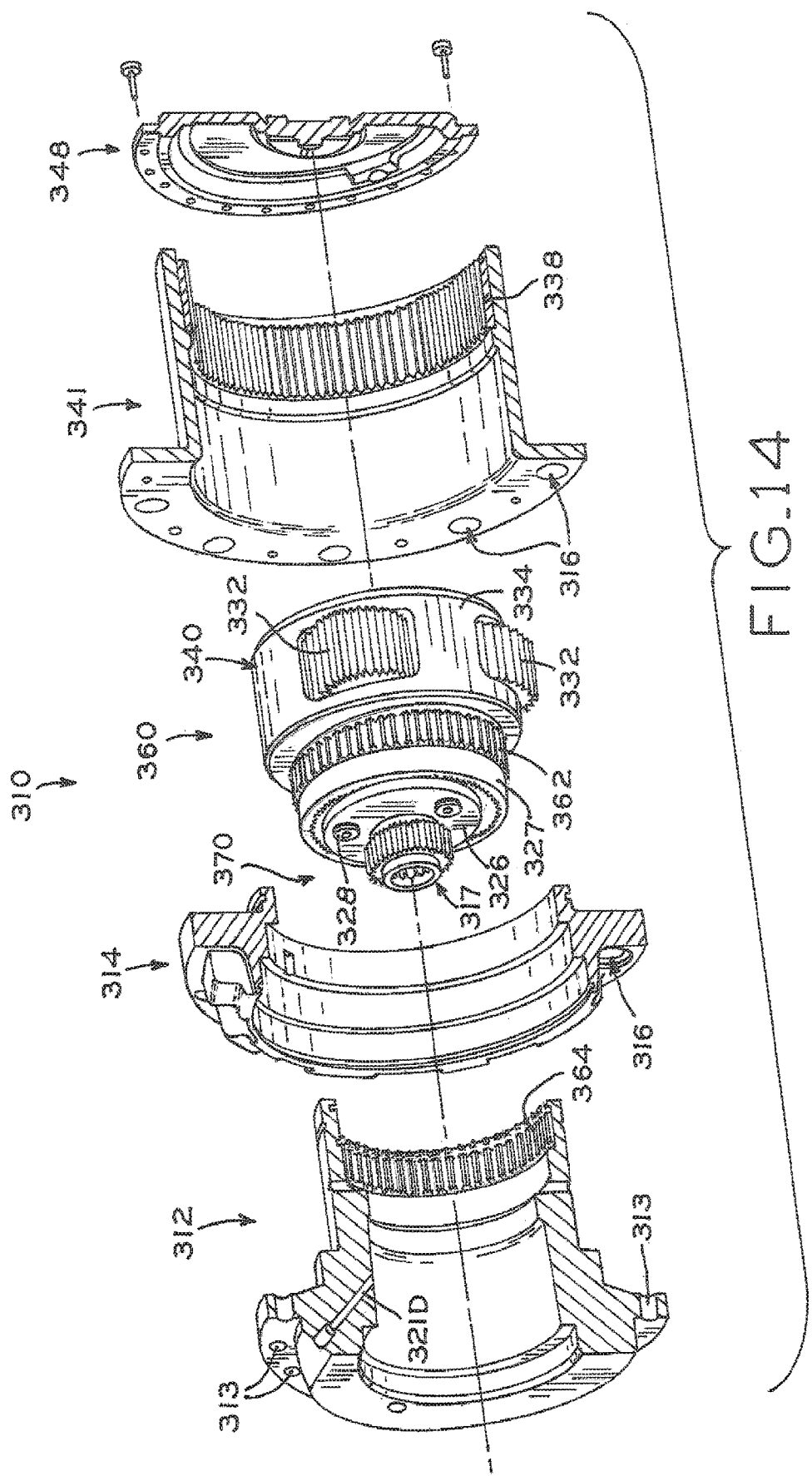
FIG. 14 is an exploded, perspective, partial section view of components of the wheel drive shown in FIG. 11, illustrating the planetary reduction subassembly of FIG. 13 and the wheel drive components which mount thereto.

Input component 317 is received through the central opening formed at the input side of planet gear carrier 326, such that the exterior splines of sun gear 320 intermeshingly engage with the exterior splines of each of the respective planet gears 324. In the illustrated embodiment, input component 317 also includes coupler portion 318 which extends axially outside of combination component 340 as illustrated in FIG. 14. Coupler portion 318 includes interior splines sized and configured to receive a power input shaft (not shown), and exterior brake splines 368 sized and configured to engage a braking system (not shown) similar to braking systems 121 and 221 described herein, such as by intermeshingly engaging with corresponding splines formed at the interior surfaces of respective clutch plates.

With input component seated in engagement with planet gears 324 and planet gears 324 seated in ring gear 327, primary planetary stage 370 is fully assembled and forms as a portion of planetary reduction assembly 360. Combination component 340 and the other components included in planetary reduction assembly 360 are shown in the exploded view of FIG. 13.

To assemble secondary planetary stage 380, secondary planet gears 332 are received within planet gear carrier 334, which is disposed at the output-side axial end of component 340 (i.e., opposite ring gear 327). The central bores formed in planet gears 332 are aligned with respective axle apertures 337, as illustrated by a comparison of FIGS. 13 and 14, and gear axles 336 are passed through apertures 337 and the bores of planet gears 332 to rotatably couple planet gears 332 to planet gear carrier 334. Bearings (not shown) may be interposed between planet gears 332 and their respective axles 336 to promote smooth rotation of gears 332, similar to bearings 323 described above. Secondary sun gear 330 is then advanced axially into the opening formed in the axial end of combination component 340 such that its exterior splines are intermeshingly engaged with the corresponding exterior splines of respective planet gears 332.

Secondary sun gear 330 also includes interstage splines 358 (FIG. 13), which intermeshingly engage with correspondingly formed interstage splines 359 of planet gear carrier 326 when sun gear 330 is in its fully seated position within combination component 340. Interstage splines 358, 359 cooperate to rotatably fix primary planet gear carrier 326 to secondary sun gear 330, which also functionally couples the primary and secondary planetary stages 370, 380.

At this point, all components of secondary planetary stage 380 that are part of planetary reduction assembly 360 are assembled, and planetary reduction assembly 360 is complete. To functionally complete secondary planetary stage 380, planet gears 332 are engaged with secondary ring gear 338 as described below, but ring gear 338 is not a part of the self-contained assembly 360.

FIG. 14 illustrates planetary reduction assembly 360 is in its fully assembled configuration, together with additional components of wheel drive 310. To assemble wheel drive 310, hub 314 is rotatably received upon spindle 312 as described herein. In the illustrated embodiment, bearing 342 is received on the outer surface of spindle 312 prior to installation of hub 314, and hub 314 cooperates with spindle 312 to axially fix bearing 342 in its designated location. Bearing 344 is installed on the opposite axial end of hub 314 as shown in FIG. 12, and fixed in place by bearing nut 372 and bearing nut washer 374.

Figure 10:
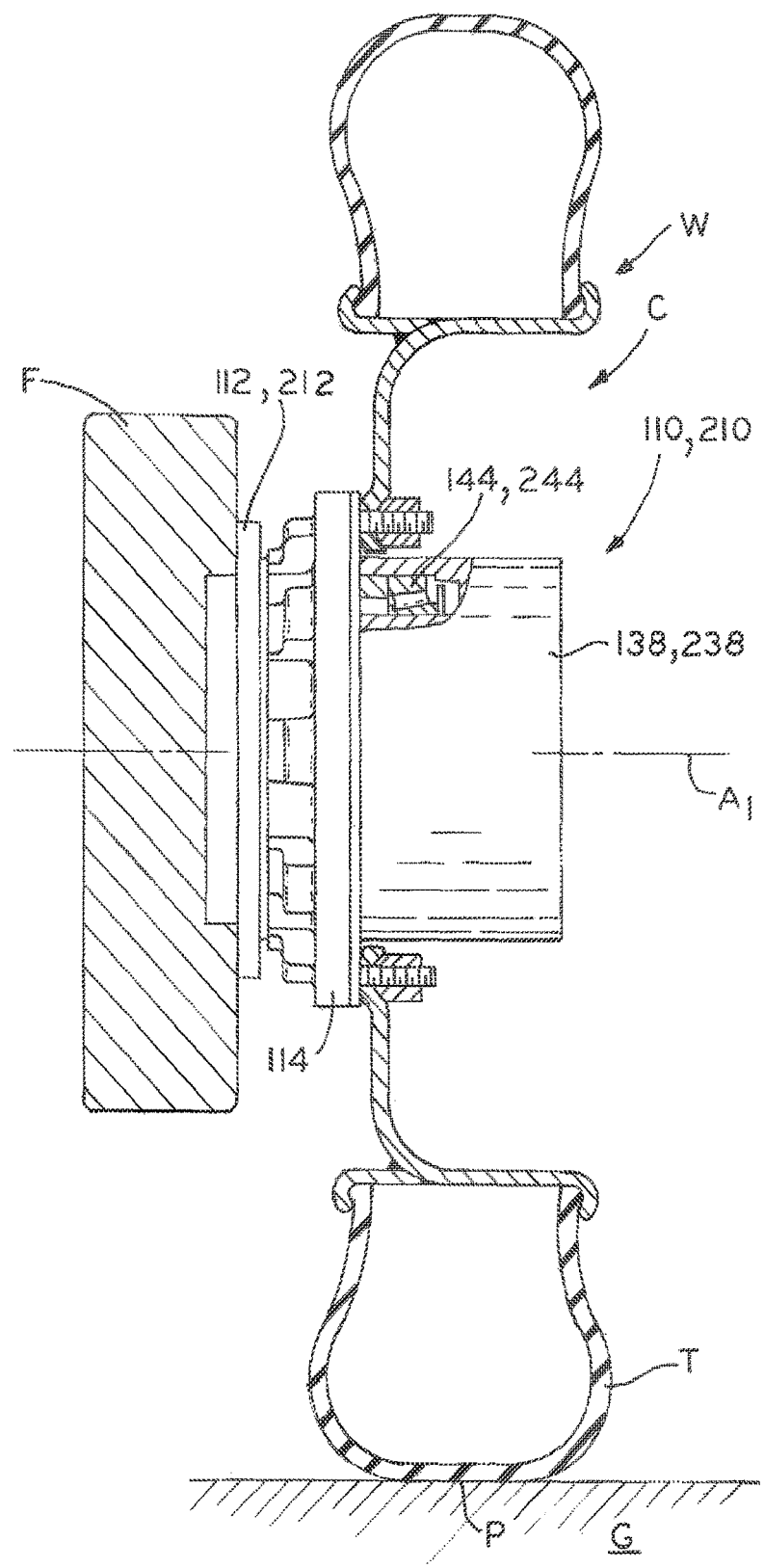
FIG. 10 is a partial cross-section, elevation view of a wheel drive made in accordance with the present disclosure attached to a vehicle frame and having a wheel attached to the wheel drive.

Planetary reduction assembly 360 is rotatably fixed to spindle 312 by engaging external coupling splines 362, which are formed around the exterior annular surface of combination component 340 near its input-side axial end, with corresponding internal coupling splines 364, which are formed around an interior annular surface of hub 314 near its output-side axial end. When splines 362, 364 are so engaged, splined connection 366 is formed (FIG. 12) which rotatably fixes planetary reduction assembly 360 to spindle 312. As noted above with respect to spindle 112, spindle 312 may itself be rotatably fixed by being mounted to an adjacent mounting surface, such as vehicle frame F (FIG. 10).

When planetary reduction assembly 360 is rotatably coupled to spindle 312 by splined connection 366, a small amount of radial play therebetween is allowed to occur, including during operation of wheel drive 310. As further described below, this radial play facilitates "automatic" or "self" adjustment of the relative positions among the rotating and non-rotating parts of wheel drive 310 during operation of wheel drive 310, thereby promoting even pressure around bearings 342, 344 such that bearings 342, 344 can be expected to wear evenly over time.

Planetary housing 341 is installed to hub 314 by aligning the respective mounting holes 316 thereof, and passing fasteners through holes 316. Alternatively, housing 341 can be installed to hub 314 before planetary reduction assembly 360 is rotatably fixed to spindle 312. When so assembled, the inwardly facing splines of ring gear 338 intermeshingly engage with the outwardly facing splines of each respective secondary planet gear 332, thereby completing the assembly of secondary planetary stage 380. In the illustrated embodiment of FIG. 14, secondary ring gear 338 is formed as a separate part which is axially received and seated within planetary housing 341, though it is contemplated that housing 341 and ring gear 338 may be monolithically formed as a single component.

Finally, cover 348 is received over the open axial end of housing 341, which protects the internal components of wheel drive 310 and axially constrains planetary reduction assembly 360 from movement toward the output side of wheel drive 310 during operation.

As noted above, combination component 340 is a monolithic, integrally formed component which may be produced, e.g., by preparing a casting to create the rough metal part and machining the high tolerance features, including ring gear 327, external coupling splines 362 and axle apertures 337. As compared with spindles 112 and 212, formation of primary ring gear 327 is less complex and less expensive because the tooling required to machine the individual splines of ring gear 327 need not traverse a significant axial distance into combination component 340. For example, in the case of ring gear 327, the tooling only needs to travel the axial extent of the ring gear splines themselves to create the desired feature. In addition, this type of construction can be used to efficiently ensure a high degree of coaxiality between the primary and secondary planetary stages 370, 380 as further described below. In the illustrative embodiment of FIG. 13, the casting of component 340 provides an input-side portion (home to primary stage 370 and including primary ring gear 327) which defines an input-side diameter which is smaller than the diameter of the opposing output-side portion (home to secondary stage 380 and including secondary planetary gear carrier 334). This disparity of diameters reflects the fact that primary planetary stage 370 operates at relatively high speeds and handles lower torque, and can therefore be smaller in size as compared to secondary planetary stage 380 which operates at relatively lower speeds and transmits greater nominal amounts of torque.

In the illustrated embodiment of FIGS. 11-14, the respective longitudinal axes of sun gear 320 and planet gear carrier 326 of primary planetary stage 370 are nominally coaxial with the longitudinal axis of combination component 340, and each of these longitudinal axes is nominally coaxial with longitudinal axis $A_1$ of wheel drive 310 upon assembly. During manufacture of combination component 340, the inwardly facing splines of ring gear 327 are machined with an appropriately tight tolerance to control the radial deviation of the longitudinal axes of sun gear 320 and planet gear carrier 326 from axis $A_1$. Similarly, the radial locations of axle apertures 337 relative to longitudinal axis $A_1$ can be controlled in cooperation with the size and cylindricity of secondary planet gears 332 to constrain radial deviation of the longitudinal axes of secondary planet carrier 334 and secondary sun gear 330 from longitudinal axis $A_1$ to within a desired tolerance. The radial deviations of the above-described components of primary and secondary planetary stages 370, 380, substantially controlled by the tolerances imparted to combination component 340, result in nominal coaxiality and concentricity among the components of planetary stages 370, 380 within a desired tolerance which may be set to any desired nominal value as required or desired for a particular application.

In addition to this precise axial alignment between primary and secondary planetary stages 370, 380, a relatively more permissive radial tolerance is provided between combination component 340 and spindle 312 by splined connection 366 (FIG. 12) formed between external coupling splines 362 (FIG. 14) and internal coupling splines 364 (FIG. 14). This relatively permissive tolerance at splined connection 366 allows planetary reduction assembly 360 to "float" radially with respect to spindle 312 upon assembly, within a desired nominal radial range. This radial float, in turn, allows hub 314 to self-align with respect to spindle 312 during operation of wheel drive 310, as further described below.

Upon assembly, the relative spatial arrangement between bearings 342, 344, spindle 312, hub 314 and housing 341 (FIG. 12) establish a natural radial alignment among these components in which bearings 342, 344 are evenly stressed around their peripheries, and peak stresses on bearings on 342, 344 are concomitantly minimized. If this natural radial alignment is maintained upon assembly of the remainder of wheel drive 310, as well as throughout its service life as bearings 342, 344 "wear in" during use, this stress minimization will persist and thereby maximize the life of bearings 342, 344. The permissive tolerance at splined connection 366 avoids disruption of this natural radial alignment by providing a nominal radial deviation between combination component 340 and spindle 312 that is greater than the expected nominal deviation resulting from the natural radial alignment of bearings 342, 344, spindle 312, hub 314 and housing 341 throughout the expected service life of bearings 342, 344, it being understood that the radial deviation (i.e., non-coaxiality) of the longitudinal axes of spindle 312 and hub 314 can be expected to increase as bearings 342, 344 age. Moreover, it is contemplated that the coaxiality of spindle 312, hub 314 and housing 341 may be substantially set and controlled by the function and operation of bearings 342, 344, because spindle 312, hub 314 and housing 341 are manufactured to greater coaxiality tolerances than bearings 342, 344 provide.

In an exemplary embodiment, the nominal coaxiality and concentricity of spindle 312, hub 314 and housing 341, as set by bearings 342, 344 and allowing only for the above-described "natural radial alignment," may deviate by a known nominal tolerance over the rated service life of bearings. By contrast, the nominal coaxiality of planetary reduction assembly 360 and spindle 312 may deviate by the designed tolerance of splined connection 366. In an exemplary embodiment, the tolerance of splined connection 366 is greater than the tolerance of the "natural radial alignment" of wheel drive 310, ensuring that 342, 344 will not experience premature wear owing to an overly-rigid connection between hub 314, housing 341 and spindle 312.

In this way, the spatial arrangement of spindle 312, bearings 342, 344, and hub 314/housing 341 is taken to be the basis for component alignment in wheel drive 310 between the non-rotating components (e.g., spindle 312, combination component 340) and the rotating output components (e.g., hub 314, housing 341). The radial positions of housing 341 and hub 314 relative to spindle 312, and therefore the concentricity of these components during operation of wheel drive 310, is primarily controlled by the pressure exerted by bearings 342, 344.

Notwithstanding the specific design and arrangement of parts shown in the figures with respect to wheel drive 310, including combination component 340 including primary ring gear 327 and secondary planet gear carrier 334, it is contemplated that other arrangements may be utilized within the scope of the present disclosure. For example, although primary ring gear 327 and secondary planet gear carrier 334 are the "stationary" or non-rotating components of planetary stages 370, 380 respectively, it is appreciated that alternative designs may select other components as stationary components to be integrated into a combination component similar to combination component 340.

Moreover, a combination component in accordance with the present disclosure may include any one component from each of planetary stages 370, 380, with the selected components integrally and monolithically formed as a part of the combination component, as described above with respect to combination component 340. In some applications, for example, primary ring gear 327 may be rotatable and primary planet gear carrier 326 may be stationary, in which case primary planet gear carrier 326 would be integrally formed as a part of a combination component. Similarly, secondary ring gear 338 can be integrally formed as a part of the combination component, and secondary planet carrier 334 may be rotatable. Any permutation or combination of components may be provided in combination component 340, provided that one component from each of planetary stages 370, 380 is included and planetary stages 370, 380 are operably linked to one another to cooperate in producing the final speed reduction of wheel drive 310.

The use of combination component 334 as shown in FIGS. 11-14 also facilitates disassembly, field servicing and inspection of wheel drive 310. As noted herein, wheel drive 310 may be mounted to a vehicle via spindle 312, which may be fixed to an adjacent frame surface via mounting holes 313. A wheel W (FIG. 10) may be mounted to hub 314 (and housing 341) via mounting holes 316 (FIG. 14). For field service of any of the components of planetary assembly 360, it is expedient to leave spindle 312 fixed in place and avoid removal of the wheel W.

Wheel drive 310 allows for such field service by granting access to the servicer of each component of planetary assembly 360 by removal of cover 348 to expose the otherwise enclosed interior of wheel drive 310. Combination component 334 can then be simply withdrawn from the interior of wheel drive 310, together with its associated attached components of assembly 360. In particular, such removal of combination component 334 and the other components of planetary assembly 360 leaves hub 314 and housing 341 fully supported upon spindle 312 via bearings 342, 344, such that field service of the components of assembly 360 may be performed without otherwise supporting or disconnecting other wheel drive or vehicle components.

Once combination component 334 and the associated components of planetary assembly 360 have been withdrawn from housing 341, further service is also enabled. For example, inspection of ring gear 338 and outer bearing 344 may be performed without further steps. The components of braking system 121, if provided (as shown in FIGS. 2 and 4 with respect to wheel drive 110) are also accessible and may be serviced or replaced as appropriate.

In addition, if the vehicle is supported to remove weight from the wheel W and hub 314, then hub 314 and housing 341 can be easily removed from spindle 312 to provide access to both bearings 344 and 342, e.g., for service or replacement. In particular, bearing nut 347 (FIG. 11) may be threadably disengaged from spindle 312 to allow bearing 344 (and any adjacent bearing washer) to be withdrawn from spindle 334, at which point hub 314 and housing 341 can also be withdrawn. Bearing 342 is then visible for inspection and can be withdrawn from its seated position on spindle 312 and inspected and/or replaced. Throughout such a service procedure, in which inspection and/or replacement of bearings 342 and/or 344 requires support of the vehicle and unloading of the adjacent wheel W, spindle 312 may advantageously remain installed to the vehicle.

3. Bearing Spacing

Wheel drive 110 includes a spatial arrangement of internal components which allows roller bearings 142, 144 to be spaced apart from one another such that output-side bearing 144 is disposed at an axially outward position and relatively close to the center of gravity of wheel W mounted to hub 114 (FIG. 10). As explained in detail below, this spacing of bearings 142, 144 results in a lower application of torque and stress thereupon during service, thereby enabling bearings 142, 144 to absorb heavier loads as bearings 142, 144 support the driven wheel W mounted to hub 114 and driven by ring gear 138.

In addition, the spatial arrangement of components of wheel drive 110 allows output-side bearing 144 to be disposed between hub 114 and ring gear 138, rather than between hub 114 and spindle 112. As a result, bearing 144 can utilize a larger cross-sectional area for support of driven wheel W (FIG. 10) attached to hub 114 and ring gear 138, in turn facilitating the use of a stronger, more robust bearing at the output side of wheel drive 110.

As noted above and shown in FIG. 2, the arrangement of the components disclosed in the present wheel drive allows bearings 142, 144 to be spaced from one another by a large spacing distance $S_B$, which in turn results in a large load spacing $S_B'$. Spacing distance $S_B$ is the axial extent of the space between bearings 142, 144, i.e., the shortest distance between the respective outer surfaces of bearings 142, 144. Load spacing $S_B'$ is the axial extent between intersection points between longitudinal axis $A_1$ and bearing load lines 142L, 144L respectively. Load lines 142L, 144L extend perpendicularly to the longitudinal axes defined by bearing rollers 143, 145, respectively, and originate halfway along the axial extent of rollers 143, 145, respectively. Load lines 142L, 144L extend radially inwardly to the respective intersection points with axis $A_1$. Thus, load spacing $S_B'$ can be made larger by canting bearing rollers 143, 145, further out of parallel relationship with axis $A_1$, and smaller by canting bearing rollers 143, 145 toward a parallel orientation with respect to axis $A_1$. Such canting affects the ability of bearings 142, 144 to absorb forces and stresses without damage, with larger load spacing $S_B'$ associated with increased ability to absorb bending moments but decreased ability to absorb radial forces. An increase in spacing distance $S_B$ results in a corresponding increase in load spacing $S_B'$ for any given arrangement of rollers 143, 145, while also preserving the full radial capabilities of the roller arrangement. This, in turn, facilitates greater ability for bearings 142, 144 to absorb the chaotic forces and stresses which may be exerted when used on a vehicle.

Spacing distance $S_B$ also cooperates with the respective sizes of bearings 142, 144 to define functional bearing center line BC. Center line BC is axially positioned such that, when a radial force is applied to bearings 142, 144 over time, bearings 142, 144 can be expected to wear at an even rate. Thus, if bearings 142, 144 shared equal load ratings (and usually, equal cross-sectional sizes), center line BC would be halfway between bearings 142, 144 (i.e., oriented at one-half of distance $S_B$).

However, as shown in the exemplary embodiment of FIGS. 2 and 4, bearings 142, 144 have differing load ratings. Output-side bearing 144 is disposed between the outer wall of spindle 112 and the inner wall of ring gear 138, which is a relatively larger radial and axial space such that output-side bearing 144 has a larger overall cross-section compared to input-side bearing 142, which is disposed in the relatively smaller space between the outer wall of spindle 112 and the inner wall of hub 114. The larger cross-section of output-side bearing 144 enables utilization of a higher load rating with respect to input-side bearing 142. Thus, center line BC is biased toward the bearing with a higher load rating as illustrated in FIG. 2. The amount of such biasing is proportional to the relative strengths of the bearings, i.e., if bearing 144 has a load rating twice that of bearing 142, center line SB is twice as far from bearing 142 as it is from bearing 144.

Output-side bearing 144 is axially spaced from mounting holes 116 of output hub 114 toward the output side of wheel drive 110, such that output-side bearing 144 is positioned within the axial extent of wheel W (i.e., the distance along the axis of wheel rotation from the outboard-most point of wheel W to the inboard-most point thereof, as shown in FIG. 10). This positioning is enabled by the placement of primary planetary stage 170 within spindle 112, which in turn allows output-side bearing 144 to be placed at a common axial position with primary stage 170 as illustrated in FIGS. 2 and 4. Moreover, this common axial position is such that the axial extent of bearing 144 is substantially subsumed by the axial extent of primary stage 170.

In addition, the position and relative load ratings of bearings 142, 144 dispose the functional bearing center line BC also within the axial extent of wheel W. Load spacing $S_B/S_B'$ and the positioning of bearings 142, 144 cooperate to minimize stresses exerted on bearings 142, 144 during operation of wheel drive 110, as described in detail below.

In exemplary embodiments of wheel drives 110 used on vehicle hubs, spacing distance $S_B$ may be as little as 0.419 inches, 0.75 inches or 1 inch, and as large as 1.5 inches, 1.75 inches, or 2.00 inches, or may be any distance within any range defined by any of the foregoing values. For exemplary bearings 142, 144, this results in load spacing distance $S_B'$ that is as small as 2.5 inches, 3.0 inches or 3.5 inches, and as large as 4.5 inches, 5.0 inches, or 5.5 inches, or may be any distance within any range defined by any of the foregoing values.

Each bearing 142, 144 defines bore diameter $D_B$ sized to fittingly encircle spindle 112. Diameter $D_B$ of bearings 142, 144 is slightly larger than the outer diameter of spindle 112, such that bearings 142, 144 slide easily over the outer surface of spindle 112. In exemplary embodiments of wheel drives 110 used on vehicle hubs, diameter $D_B$ may be as small as 2.0 inches, 3.0 inches or 4.0 inches, and as large as 6.0 inches, 7.0 inches, or 8.0 inches, or may have any bore size within any range defined by any of the foregoing values.

The present arrangement of components within wheel drive 110 facilitates the bearing spacing $S_B$ between bearings 142, 144, which in turn shortens the axial distance between the most axial outward point of the assembly (i.e., the approximate location of the wheel center of gravity of driven wheel W as shown in FIG. 10) and output-side bearing 144/center line BC. In other words, output-side bearing 144 and center line BC are placed closer to the point of load application upon wheel W attached to hub 114, which in turn reduces the bending torque and minimizes the stresses on bearings 142, 144.

Increasing the distance between the two bearings 142, 144 and thus decreasing the distance between center line BC and the center of gravity of wheel W is an effective way to decrease the stresses on the bearings 142, 144 while maintaining the other dimensions of wheel drive 110 according to industry standards and/or application demands. For some wheel drive designs, the overall size and configuration of wheel drive 110 are imposed as design constraints because wheel drive 110 must be compatible with existing vehicle frame mounting geometry and/or existing available vehicle wheels. For example, referring to FIG. 2, spindle 112 includes mounting holes 113 arranged annularly around a spindle bolt circle having diameter $D_S$, while hub 114 and ring gear 138 similarly include mounting holes 116 arranged annularly around a hub bolt circle having diameter $D_H$. For the exemplary embodiments noted above, diameters $D_H$ and $D_S$ are between 6.5 inches and 17.0 inches. In addition, wheel drive 110 defines overall axial length L, which in the exemplary embodiments noted above is between 7.5 inches and 15.0 inches.

The present wheel drive arrangement increases spacing $S_B$ without making any other changes to overall size and configuration of wheel drive 110, including bolt circle diameters $D_H$ and $D_S$ and overall axial length L, such that wheel drive 110 provides greater strength and capacity for bearings 142, 144 while maintaining the ability to fit wheel drive 110 into existing vehicle infrastructure.

Thus, wheel drives 110 can be provided in a wide range of overall sizes. Some very small sizes may be provided for passenger vehicle applications, such as pickup trucks and other off-road applications, while very large sizes may be provided for earth moving equipment, large construction vehicle, and the like. Generally speaking, the nominal spacing $S_B$ of bearings 142, 144 increases as the other components increase in size. Accordingly, one way to express the present wide bearing spacing in the context of a wide range of wheel drive sizes is as a ratio of spacing $S_B'$ and/or spacing $S_B$ to bearing bore diameter $D_B$. A higher $S_B:D_B$ ratio or $S_B':D_B$ ratio is indicative of a relatively greater relative spacing between bearings 142, 144, and is also indicative of the output-side bearing 144 and center line BC being closer to the center of gravity of driven wheel W (FIG. 10). Accordingly, a greater $S_B:D_B$ ratio or $S_B':D_B$ ratio generally results in higher bearing support capability for a given wheel drive size. In an exemplary design, for example, the $S_B:D_B$ ratio may be between 0.11 and 0.50, which results in a stronger and more robust wheel drive 110 as compared to existing designs. In this exemplary arrangement, the $S_B':D_B$ ratio may be between 0.690 and 1.090.

Another feature of wheel drive 110 indicative of wide spacing $S_B$ is the positioning of output side bearing 144 and center line BC relative to mounting holes 116 for driven wheel W at hub 114 and ring gear 138. As best illustrated in FIG. 2, bearing 144 is disposed axially outward relative to mounting holes 116, thereby placing bearing 144 and bearing load center line BC within the axial extent of driven wheel W when wheel W is mounted to wheel drive 110 (as shown in FIG. 10). More particularly, ring gear 138 and cover 148 are both contained within the generally cylindrical cavity C created by wheel W on a typical installation, such that ring gear 138 is directly radially inward of the contact patch P between tire T and the adjacent ground G. Stated another way, a line taken from the center of contact patch P and perpendicular to ground G intersects ring gear 138. The placing of bearing 144 axially outward of mounting holes 116 disposes bearing 144 within the axial extent of wheel W, thereby minimizing or eliminating the axial spacing between the application of force to wheel W and center line BC. This, in turn, minimizes or eliminates the lever arm which would result in a torque being placed upon bearings 142, 144, such that bearings 142, 144 need only handle the radial inward force applied by wheel W rather than such force together with a resultant torque.

4. Short-Stroke Disconnect Mechanism

Figure 7:
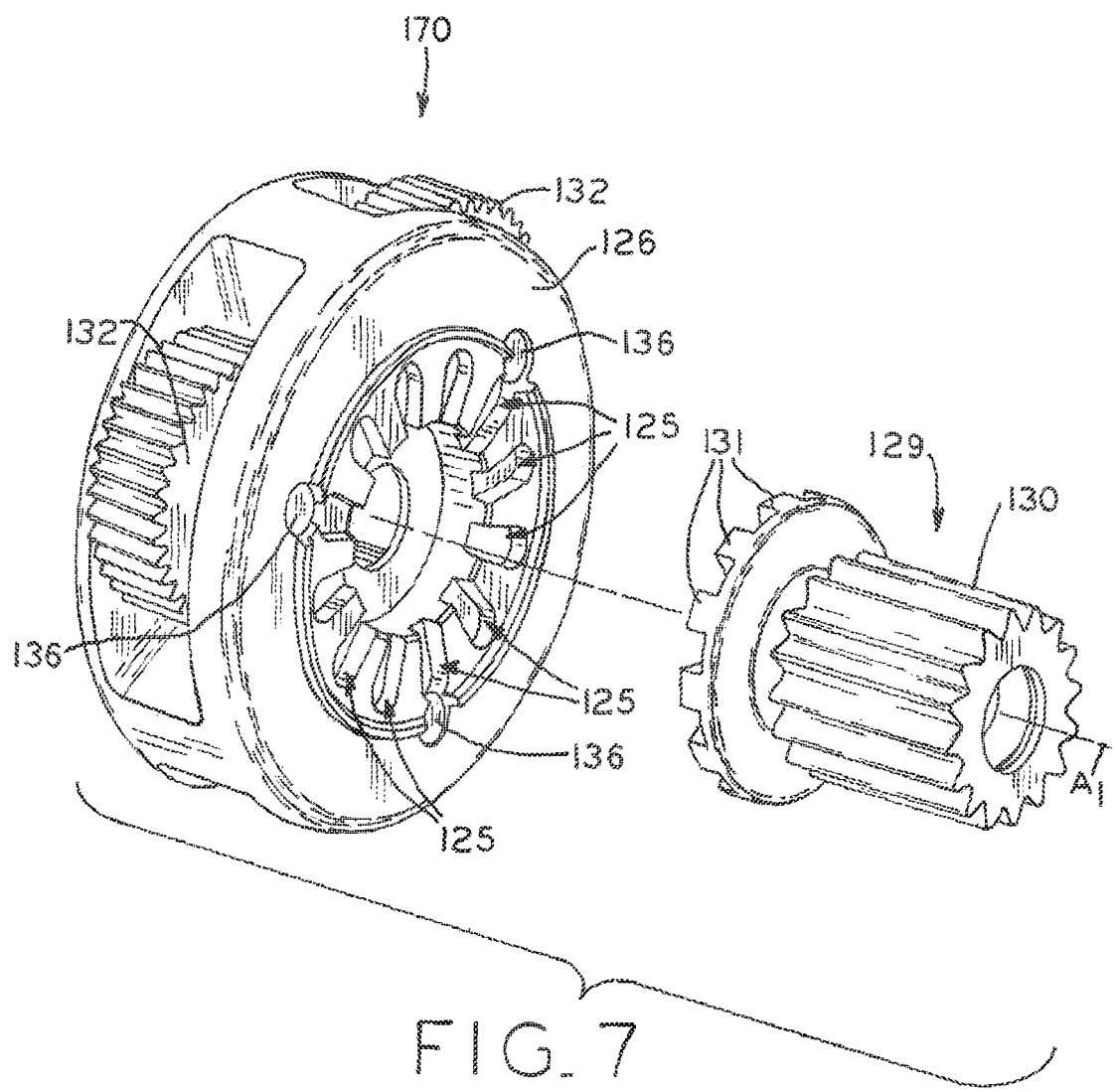
FIG. 7 is a perspective, cross-sectional view of the primary planetary stage components and the secondary sun gear shown in FIG. 2, shown with the sun gear's splines withdrawn from corresponding recesses in the primary gear carrier.
Figure 8A:
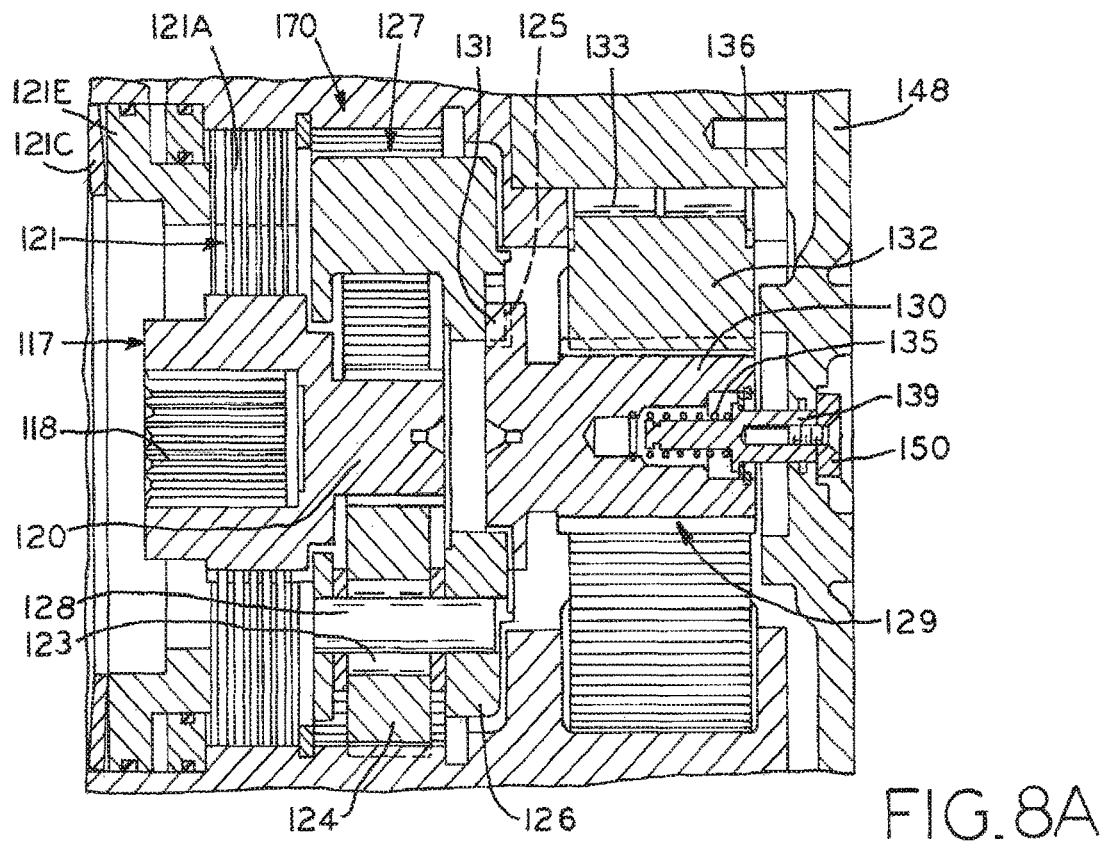
FIG. 8A is a cross-sectional, partial elevation view of the wheel drive shown in FIG. 2, illustrating the short-stroke disconnect mechanism in an engaged configuration.
Figure 8B:
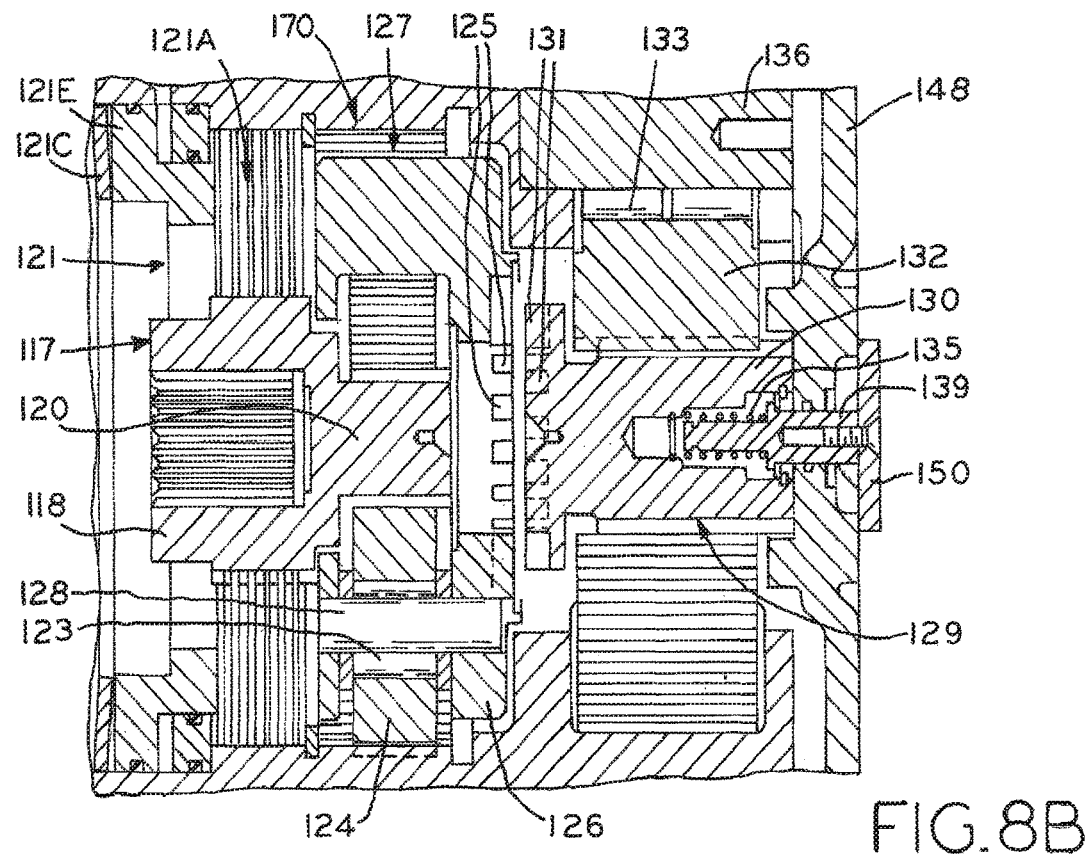
FIG. 8B is a cross-sectional, partial elevation view of the wheel drive shown in FIG. 2, illustrating the short-stroke disconnect mechanism in a disengaged configuration.
Figure 8C:
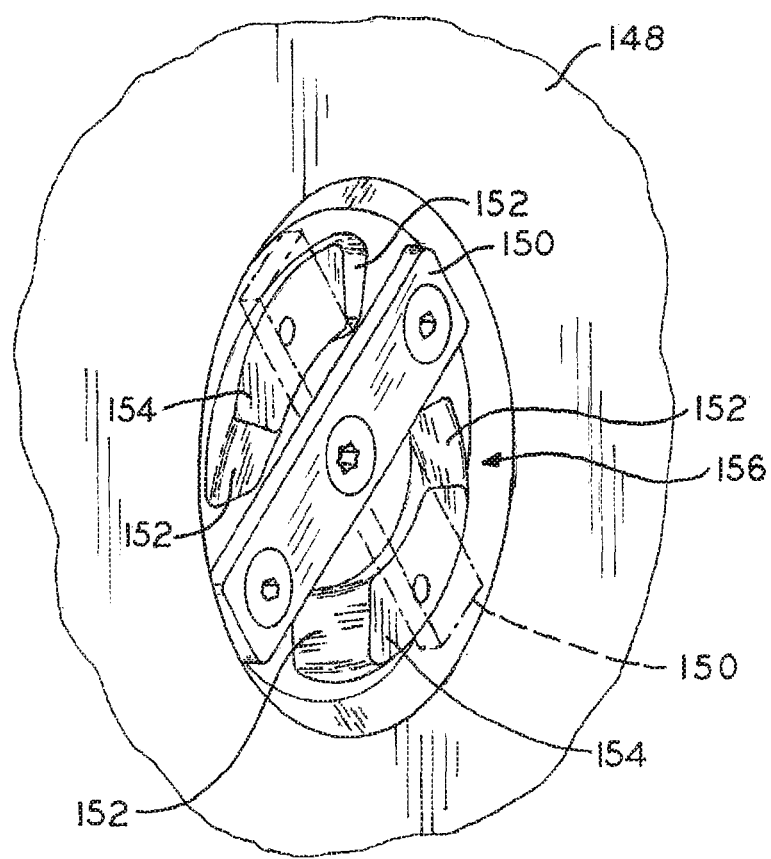
FIG. 8C is a cross-sectional, partial perspective view of the wheel drive shown in FIG. 3, illustrating a user interface for the short-stroke disconnect mechanism shown in FIGS. 8A and 8B.

FIGS. 7-8C illustrate short-stroke disconnect mechanism that can be used to disengage sun gear 130 of secondary planetary stage 180 from planet gear carrier 126 of primary stage 170, thereby allowing wheel hub 114 and wheel W to disengage from the influence of the vehicle power source. When so disengaged, the attached wheel W can spin freely with respect to spindle 112, such as for towing the vehicle. Referring to FIG. 8, the present arrangement utilizes primary/secondary coupler component 129 which facilitates a short disengagement stroke by utilizing face splines 131 protruding axially away from sun gear portion 130. Face splines 131 selectively engage corresponding recesses 125 formed in an axial end surface of primary planet gear carrier 126 to rotationally fix primary stage 170 to secondary stage 180, as further detailed below.

In an exemplary embodiment, sun gear portion 130 and face splines 131 are monolithically formed as a single piece, namely, primary/secondary coupler component 129. Similarly, recesses 125 are monolithically formed as a part of primary planet gear carrier 126. This monolithic construction contributes to long life and high strength of the short-stroke disconnection mechanism, as well as minimizing rotational backlash through the system when short-stroke disconnection mechanism is subjected to forces and torques. Moreover, as illustrated in FIGS. 8A and 8B, a minimal amount of internal volume is consumed by structures dedicated to the disconnection functionality of the short-stroke disconnection mechanism, because the bulk of primary/secondary coupler component 129 and primary planet gear carrier 126 are already present serving other functions within wheel drive 110 as described in detail above.

FIGS. 8A-8B illustrate the transition from engagement to disengagement of the short-stroke disconnection mechanism. In FIG. 8A, the mechanism is shown in the actuated configuration, in which face splines 131 are received within recesses 125. When so received, primary/secondary coupler component 129 is rotationally fixed to primary planet gear carrier 126, such that torque output from primary planetary stage 170 is input into secondary planetary stage 180 as described above. Component 129 is maintained in this engaged position by spring 135, which is compressed between an internal bore formed in sun gear portion 130 and spring plunger 139, which is fixed to lever 150 as detailed below.

FIG. 8B shows face splines 131 of sun gear 130 withdrawn from engagement with corresponding recesses 125. As described below, this withdrawn engagement is effected by rotating lever 150 to axially displace primary/secondary coupler component 129 against the biasing force of spring 135 such that face splines 131 move axially toward the output side of wheel drive 110, thereby withdrawing splines 131 axially out of recesses 125. When so withdrawn, any torque imparted to gear carrier 126 from input component 117 will no longer input into the secondary planetary stage 180, such that ring gear 138 is effectively decoupled from the vehicle power source and will not be driven by input from input component 117.

The present short-stroke withdrawal mechanism allows wheel drive 110 to be reconfigured between the engaged position of FIG. 8A, in which hub 114 and ring gear 138 are driven by input component 117, and the disengaged position of FIG. 8B, in which the input component 117 is functionally decoupled from hub 114 and ring gear 138 (such that the vehicle using wheel drive 110 can be towed or pushed without interference from the braking system 121, vehicle engine or transmission as noted above). In addition, decoupling ring gear 138 from the power source avoids rotation of the components of primary planetary stage 170 during rotation of wheel W (FIG. 10), thereby preventing wear of such components when wheel W is rotating and wheel drive 110 is not being powered by input component 117.

As noted above, the short-stroke disconnect mechanism is toggled between the engaged and disengaged configurations by rotating lever 150. Referring to FIG. 8C, such rotation results in axial displacement of lever 150 which in turn axially displaces primary/secondary coupler component 129 with respect to primary planet gear carrier 126 (FIGS. 8A and 8B). More particularly, FIG. 8C illustrates the center portion of wheel drive cover 148, which includes cam surfaces 152 and lands 154 within recess 156. When lever 150 is rotated from the engaged position (shown in solid lines of FIG. 8C) and the disengage position (shown in dashed lines), lever 150 engages cam surfaces 152 which urges lever 150 axially outwardly. As this axial outward travel occurs, spring plunger 139 (which is axially fixed to lever 150) is drawn outwardly, carrying primary/secondary coupler component 129 with it. This compresses spring 135, and simultaneously withdraws face splines 131 out of engagement with the corresponding recesses 125 formed in primary planet gear carrier 126. Resting lever 150 upon lands 154 maintains the disconnect mechanism in the disengaged state, and rotating lever 150 back down cam surfaces 152 allow spring 135 to bias lever 150, spring plunger 139 and primary/secondary coupler component 129 back in to the engaged state.

5. Multiple-Stage Planetary Systems

Wheel drive 110 utilizes primary and secondary planetary stages 170, 180 to achieve a final reduced speed and increased torque of ring gear 138 with respect to input component 117, as described above. However, it is also contemplated that other arrangements having fewer or more planetary stages can be used, such as three-stage wheel drive 210 shown in FIG. 9. This arrangement includes primary stage 270 contained within spindle 212, secondary planetary stage 280 disposed at the axial outward end of wheel drive 210 and operably connected to primary stage 270 via secondary sun gear 230, and tertiary stage 290 operably connected to secondary stage 280 via tertiary sun gear 260. Secondary and tertiary stages 280 and 290 cooperate to drive ring gear 238.

Except as otherwise noted herein, reference numbers used to refer to components of wheel drive 110 are correspondingly used in reference to wheel drive 210, except with 100 added thereto.

Primary planetary stage 270 is functionally identical to primary planetary stage 170, except that sun gear 220 is larger than sun gear 120 and planet gears 224 are concomitantly smaller than planet gears 124. It is, of course, contemplated that primary planetary stage 170 of wheel drive 110 could be identical to primary planetary stage 270. Moreover, any arrangement of planetary components may be used to provide a desired gear reduction as required or desired for a particular design.

Secondary planetary stage 280 is arranged as the output-side planetary stage, i.e., closest to the outboard side of the wheel (FIG. 10), and is disposed axially outside of spindle 212. Secondary stage 280 receives power from primary planet gear carrier 226, via primary/secondary coupler component 229 in similar fashion to wheel drive 110 described above, except that secondary sun gear 230 is a separate component rotatably fixed to coupler component 229 rather than being integrally formed therewith.

Secondary sun gear 230 includes outer splines with engage correspondingly formed outer splines of three planet gears 232, causing planet gears 232 to rotate about planet gear axles 236 within ring gear 238. Similar to FIG. 2 illustrating wheel drive 110, FIG. 9 shows only two planet gears 232 in the cross-sectional view, with the lower gear 232 shown in section and the upper gear 232 partially obscured by adjacent components. However, unlike the primary stage having stationary ring gear 227 formed along the inner wall of spindle 212, ring gear 238 of secondary stage 280 rotates as a result of the rotation of internal planet gears 232. Further, gear carrier 234 of secondary planetary stage 280 rotates as a result of the rotation of internal planet gears 232 in addition to ring gear 238. Thus, secondary planetary stage 280 has both a rotating ring gear 238 and a rotating gear carrier 234. Gear carrier 234 is rotatably fixed to sun gear 250 of tertiary planetary stage 290 and rotates sun gear 250.

Splines formed on the outer surface of tertiary sun gear 250 engage correspondingly formed external splines on the three planet gears 252, which are in turn supported by and rotate about gear axles 256 in gear carrier 254. Tertiary gear carrier 254 is integrally formed as part of spindle 212, and is therefore stationary in the context of wheel drive 210. Tertiary planet gears 252 rotate about gear axles 256 while engaging the internal splines of ring gear 238 to aid in rotation of ring gear 238. Accordingly, planet gears 232 and 252 of both secondary and tertiary planetary stages 270, 280 cooperate to drive ring gear 238, with secondary planet gears 232 allowed to circumnavigate secondary sun gear 230 while tertiary planet gears 252 do not circumnavigate.

As with wheel drive 110, rotation of ring gear 238 forms the final output of wheel drive 210, and rotates wheel W at a rotational speed that has been reduced three times—once by each of the three planetary stages 270, 280, and 290.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A speed-reducing transmission unit comprising:
   a spindle defining a longitudinal spindle axis, said spindle configured to affix to a frame at an input side of the transmission unit, and having a terminal output-side axial end;
   a hub defining a longitudinal hub axis, said hub rotatable with respect to said spindle about said longitudinal hub axis and configured to affix to a driven structure at an output side of the transmission unit;
   a planetary reduction assembly comprising:
      a primary planetary stage functionally interposed between said spindle and said hub, said primary planetary stage comprising a plurality of primary components including a primary sun gear, a primary planet gear carrier, a primary planet gear in splined engagement with the primary sun gear and rotatably attached to the primary planet gear carrier, and a primary ring gear in splined engagement with the primary planet gear;
      a secondary planetary stage functionally interposed between said spindle and said hub, said secondary planetary stage comprising a plurality of secondary components including a secondary sun gear, a secondary planet gear carrier, a secondary planet gear in splined engagement with the secondary sun gear and rotatably attached to the secondary planet gear carrier, and a secondary ring gear in splined engagement with the secondary planet gear,
      one of the plurality of primary components comprising a primary input and another of the plurality of primary components comprising a primary output, and one of the plurality of secondary components comprising a secondary input and another of the plurality of secondary components comprising a secondary output, the primary output operably coupled to the secondary input such that the primary planetary stage and the secondary planetary stage cooperate to produce a final speed reduction between the spindle and the hub; and
      a combination component comprising one of the plurality of primary components and one of the plurality of secondary components integrally formed as a part thereof,
   the combination component further comprising a terminal input-side axial end selectively rotatably fixable to the terminal output-side axial end of the spindle.

2. The speed-reducing transmission unit of claim 1, wherein:
   the primary input comprises the primary sun gear;

the primary output comprises the primary planet gear carrier;
the secondary input comprises the secondary sun gear;
the secondary output comprises the secondary ring gear; and
the combination component comprises the primary ring gear and the secondary planet gear carrier.

3. The speed-reducing transmission unit of claim 1, wherein the combination component further comprises a first set of coupling splines and the spindle comprises a second set of coupling splines, the first and second sets of coupling splines interleaved to define a splined connection when the combination component is selectively rotatably fixed to the spindle.

4. The speed-reducing transmission unit of claim 3, wherein:
the first set of coupling splines comprise external coupling splines formed on an exterior annular surface of the combination component; and
the second set of coupling splines comprise internal coupling splines formed on an interior annular surface of the spindle.

5. The speed-reducing transmission unit of claim 3, wherein the secondary ring gear is fixed to a planetary housing fixed to the hub, the speed-reducing transmission unit further comprising:
an input-side bearing mounted to an outer wall of the spindle and occupying a first space between the outer wall of the spindle and an inner wall of the hub, such that the input-side bearing rotatably supports the hub; and
an output-side bearing mounted to the outer wall of the spindle and occupying a second space between the outer wall of the spindle and an inner wall of the planetary housing.

6. The speed-reducing transmission unit of claim 5, wherein:
the combination component defines a component longitudinal axis, the spindle defines a spindle longitudinal axis and the hub defines a hub longitudinal axis;
the component longitudinal axis and the spindle longitudinal axis are coaxial within a first tolerance set by the splined connection between the combination component and the spindle; and
the hub longitudinal axis and the spindle longitudinal axis are coaxial within a second tolerance set by at least one of the input-side bearing and the output-side bearing, the first tolerance greater than the second tolerance, whereby at least one of the input-side bearing and the output-side bearing primarily controls the concentricity of the hub and the spindle.

7. The speed-reducing transmission unit of claim 5, wherein the secondary ring gear is integrally formed as a single monolithic part with the planetary housing.

8. A planetary reduction assembly comprising:
a primary planetary stage comprising:
a primary sun gear configured and positioned as a primary power input for the primary planetary stage;
a primary planet gear carrier configured and positioned as a primary power output for the primary planetary stage;
a primary planet gear in splined engagement with the primary sun gear and rotatably attached to the primary planet gear carrier; and
a primary ring gear in splined engagement with the primary planet gear;
a secondary planetary stage comprising:
a secondary sun gear rotatably fixed to the primary planet gear carrier, such that the secondary sun gear is a secondary power input for the secondary planetary stage;
a secondary planet gear carrier; and
a secondary planet gear in splined engagement with the secondary sun gear and rotatably attached to the secondary planet gear carrier; and
a combination component monolithically formed as a single part and comprising the primary ring gear at a first terminal axial end and the secondary planet gear carrier at a second terminal axial end opposite the first terminal axial end.

9. The planetary reduction assembly of claim 8, in combination with a secondary ring gear in splined engagement with the secondary planet gear, the secondary ring gear configured and positioned as a secondary power output for the secondary planetary stage.

10. The planetary reduction assembly of claim 8, further comprising a set of external coupling splines formed on an exterior annular surface of the combination component, the external coupling splines configured to interleave with internal coupling splines of a spindle to rotatably fix the planetary reduction assembly to the spindle.

11. The planetary reduction assembly of claim 8, wherein the primary sun gear includes a coupling portion including an internal splined bore configured to interleave with a correspondingly splined powered input shaft.

12. The planetary reduction assembly of claim 11, wherein the coupling portion includes an external splined surface configured to interleave with clutch plates of a braking system.

13. The planetary reduction assembly of claim 8, wherein:
an input-side portion of the combination component includes the primary ring gear and defines an input-side diameter; and
an output-side portion of the combination component includes the secondary planet gear carrier and defines an output-side diameter larger than the input-side diameter.

14. A method of manufacturing a speed-reducing transmission unit, the method comprising:
installing a primary planetary stage at a first terminal axial end of a monolithically formed combination component;
installing a secondary planetary stage at a second terminal axial end of the monolithically formed combination component opposite the first terminal axial end, such that the primary and secondary planetary stages are operably linked and cooperate to produce a final speed reduction between an input and an output of the transmission unit; and
rotatably fixing the monolithically formed combination component to a spindle.

15. The method of claim 14, wherein:
the step of installing the primary planetary stage comprises:
rotatably coupling a primary planet gear to a primary planet gear carrier;
intermeshingly engaging external splines of a primary sun gear with corresponding external splines of the primary planet gear;
intermeshingly engaging the external splines of the primary planet gear with corresponding interior splines of a primary ring gear, the primary ring gear formed as an integral part of the monolithically formed combination component; and the step of installing the secondary planetary stage comprises:
  rotatably coupling a secondary planet gear to a secondary planet gear carrier, the secondary planet gear carrier formed as an integral part of the monolithically formed combination component;
  intermeshingly engaging external splines of a secondary sun gear with corresponding external splines of the secondary planet gear; and
  rotatably fixing the secondary sun gear to the primary planet gear carrier to effect the operable link between the primary and secondary planetary stages.

16. The method of claim 15, further comprising:
rotatably coupling a hub to the spindle via at least one bearing disposed between the hub and the spindle, the hub fixed to a secondary ring gear;
intermeshingly engaging interior splines of the secondary ring gear with the external splines of the secondary planet gear, whereby rotation of the primary sun gear effects rotation of the hub at a slower rotational speed.

17. The method of claim 16, wherein:
the step of rotatably fixing the monolithically formed combination component to the spindle defines a first radial tolerance between the combination component and the spindle; and
the step of rotatably coupling the hub to the spindle via at least one bearing defines a second radial tolerance between the hub and the spindle, the first radial tolerance greater than the second radial tolerance such that the at least one bearing substantially controls the concentricity of the hub and the spindle.

18. A method of servicing a wheel drive having a spindle fixed to a vehicle, a hub rotatable with respect to the spindle, and a wheel fixed to the hub, the wheel drive further including a planetary reduction assembly operably interposed between the spindle and the hub, the method comprising:
  removing a cover from the wheel drive to expose an otherwise enclosed interior of the wheel drive; and
  withdrawing a combination component having components of the planetary reduction assembly from the interior of the wheel drive, while leaving the hub fixed to the vehicle and the wheel fixed to the hub.

19. The method of claim 18, further comprising inspecting at least one bearing contained within the interior of the wheel drive.

20. The method of claim 18, further comprising inspecting at least one braking component within the interior of the wheel drive while leaving the hub fixed to the vehicle and the wheel fixed to the hub.

21. The method of claim 18, further comprising:
supporting the vehicle such that the wheel is unloaded; and
removing the hub from the spindle without removing the spindle from the vehicle.

* * * * *